United States Patent
Irie et al.

(10) Patent No.: US 7,200,102 B2
(45) Date of Patent: Apr. 3, 2007

(54) OPTICAL RECORDING MEDIUM AND RECORDING METHOD FOR THE SAME

(75) Inventors: Hiroaki Irie, Takatsuki (JP); Keiichiro Horai, Sanda (JP); Kenichi Nishiuchi, Hirakata (JP); Mitsuaki Oshima, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 8 days.

(21) Appl. No.: 11/085,398

(22) Filed: Mar. 21, 2005

(65) Prior Publication Data

US 2005/0163030 A1 Jul. 28, 2005

Related U.S. Application Data

(62) Division of application No. 09/786,877, filed as application No. PCT/JP00/04713 on Jul. 13, 2000.

(30) Foreign Application Priority Data

Jul. 15, 1999 (JP) ................................. 11-201212

(51) Int. Cl.
*G11B 7/24* (2006.01)

(52) U.S. Cl. ................................. 369/275.3; 369/53.21

(58) Field of Classification Search ............. 369/275.3, 369/53.21, 47.19, 47.21, 47.22, 59.23, 59.25; 380/201, 203; 713/179, 193; 705/51, 52, 705/57

See application file for complete search history.

(56) References Cited

U.S. PATENT DOCUMENTS

| 5,452,284 A | 9/1995 | Miyagawa et al. |
| 5,616,390 A | 4/1997 | Miyagawa et al. |
| 5,726,969 A | 3/1998 | Moriya et al. |
| 5,818,812 A | 10/1998 | Moribe et al. |
| 5,852,599 A | 12/1998 | Fuji |

(Continued)

FOREIGN PATENT DOCUMENTS

EP 0 549 488 6/1993

(Continued)

OTHER PUBLICATIONS

Chinichi Tanaka, et al.; "DVD no ROM Disk eno Tsuiki Jouhou Kiroku Gijutsu: BCA (Burst Cutting Area)"; Technical Research Report of the Institute of Electronics, Information and Communication Engineers, MR97-33; Oct. 1997; pp. 33-38. (Partial English translation).

*Primary Examiner*—Thang V. Tran
(74) *Attorney, Agent, or Firm*—Hamre, Schumann, Mueller & Larson, P.C.

(57) ABSTRACT

A main information area 31 capable of recording an information signal and a subsidiary information area 32 for recording subsidiary information that is different from the information signal are divided in one principal plane direction of a substrate, and an information layer for recording the information signal in the main information area 31 is provided also in the subsidiary information area 32, and medium identification information for distinguishing the medium optically is recorded in the information layer of the subsidiary information area 32 without changing the shape of the information layer. As a result, the medium identification information can be recorded in an optical recording medium 1 stably. In particular, the initialization of a phase change type optical recording medium and the recording of the medium identification information can be performed at the same time, so that the production process can be simplified, and the production costs can be reduced.

2 Claims, 24 Drawing Sheets

U.S. PATENT DOCUMENTS

| | | |
|---|---|---|
| 5,883,958 A | 3/1999 | Ishiguro et al. |
| 5,936,933 A | 8/1999 | Miyamoto et al. |
| 6,002,655 A | 12/1999 | Ono et al. |
| 6,052,465 A | 4/2000 | Gotoh et al. |
| 6,266,299 B1 | 7/2001 | Oshima et al. |
| 6,370,091 B1 | 4/2002 | Kuroda |
| 6,457,128 B1 * | 9/2002 | Gotoh et al. ............ 713/193 |
| 6,519,213 B1 | 2/2003 | Song et al. |
| 6,550,009 B1 | 4/2003 | Uranaka et al. |
| 6,633,853 B2 | 10/2003 | Oshima et al. |
| 6,724,705 B1 | 4/2004 | Ko et al. |
| 6,973,015 B1 | 12/2005 | Murakami et al. |

FOREIGN PATENT DOCUMENTS

| | | |
|---|---|---|
| EP | 0 715 301 | 6/1996 |
| EP | 0 756 279 | 1/1997 |
| EP | 0 802 527 | 10/1997 |
| EP | 1 152 402 | 11/2001 |
| JP | 2-301020 | 12/1990 |
| JP | 3-219440 | 9/1991 |
| JP | 5-314538 | 11/1993 |
| JP | 6-176404 | 6/1994 |
| JP | 6-309673 | 11/1994 |
| JP | 6-338066 | 12/1994 |
| JP | 09073666 | 3/1997 |
| JP | 9-91781 | 4/1997 |
| JP | 9-97216 | 4/1997 |
| JP | 9-120584 | 5/1997 |
| JP | 9-259438 | 10/1997 |
| JP | 9-265633 | 10/1997 |
| JP | 09306144 | 11/1997 |
| JP | 10-65662 | 3/1998 |
| JP | 10-83567 | 3/1998 |
| JP | 10188280 | 7/1998 |
| JP | 10-233019 | 9/1998 |
| JP | 11-162031 | 6/1999 |
| WO | 98/58368 | 12/1998 |
| WO | 01/6502 | 1/2001 |

* cited by examiner

FIG. 11
(1) during BCA recording 1
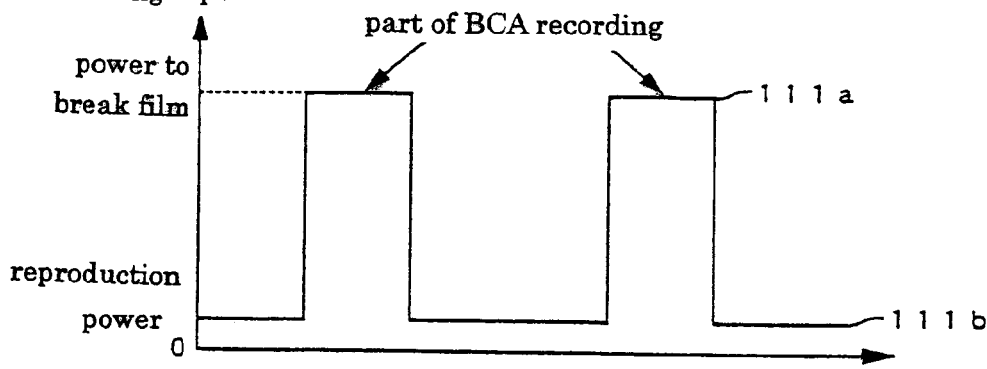
(2) during initialization
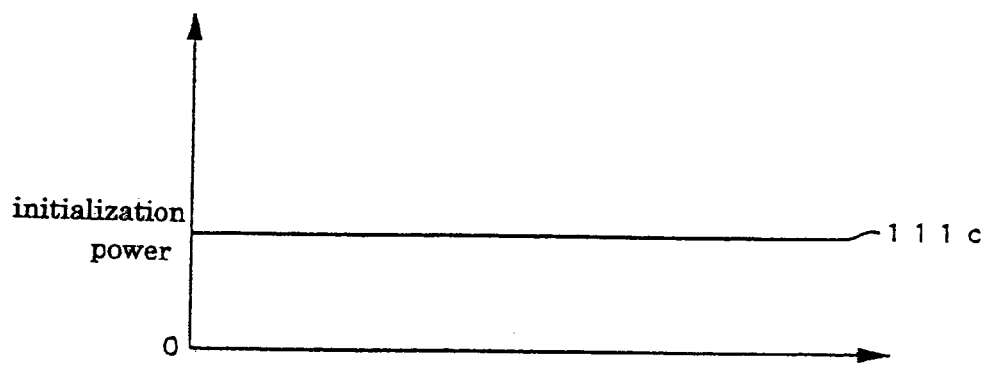
(3) during BCA recording 2
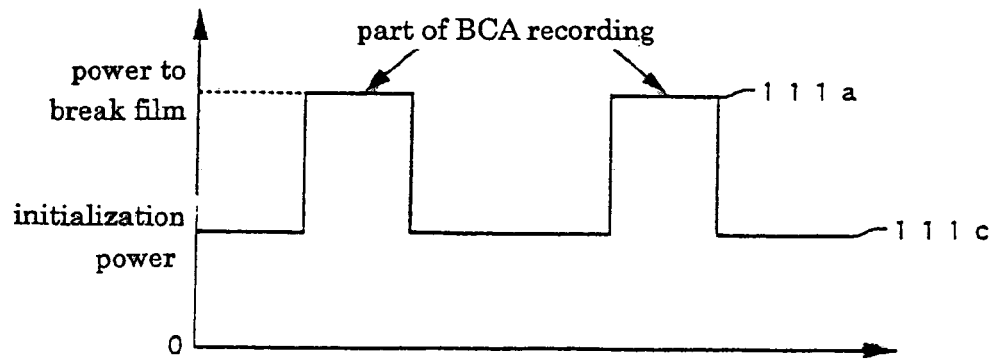

FIG. 17

(a) data configuration (n=1, 12 bytes)

(b) virtual data configuration for ECC calculation (n=1, 12 bytes)

FIG. 18

(a) data of synchronous code

| Sync Byte /Resync | Bit Pattern | | | | | | | | | | | |
|---|---|---|---|---|---|---|---|---|---|---|---|---|
| | Fixed Pattern (Channel bit) | | | | | | | | Sync Code (Data bit) | | | |
| | $C_{15}$ | $C_{14}$ | $C_{13}$ | $C_{12}$ | $C_{11}$ | $C_{10}$ | $C_9$ | $C_8$ | $b_3$ | $b_2$ | $b_1$ | $b_0$ |
| SB | 0 | 1 | 0 | 0 | 0 | 1 | 1 | 0 | 0 | 0 | 0 | 0 |
| RS 1 | 0 | 1 | 0 | 0 | 0 | 1 | 1 | 0 | 0 | 0 | 0 | 1 |
| RS 2 | 0 | 1 | 0 | 0 | 0 | 1 | 1 | 0 | 0 | 0 | 1 | 0 |
| ⋮ | | | | | | | | | | | | |
| RS i | 0 | 1 | 0 | 0 | 0 | 1 | 1 | 0 | | | i | |
| ⋮ | | | | | | | | | | | | |
| RS 15 | 0 | 1 | 0 | 0 | 0 | 1 | 1 | 0 | 1 | 1 | 1 | 1 |

← 4data bit → ← 4data bit →

(b) fixed synchronous pattern 0 1 0 0 0 1  | 1  0 ← first trimming record
             | (0 1) ← second trimming record trimming frequency identifier — 947

$T_1$ $T_2$ $T_3$ $T_4$

OPTICAL RECORDING MEDIUM AND RECORDING METHOD FOR THE SAME

This application is a division of application Ser. No. 09/786,877, filed Mar. 12, 2001, which is a National Stage of application no. PCT/JP00/04713 filed Jul. 13, 2000, which applications are incorporated herein by reference.

TECHNICAL FIELD

The present invention relates to an optical recording medium and a method for recording information in the optical recording medium.

BACKGROUND ART

In recent years, the amount of information to be recorded in a single optical recording medium has been increasing, and the distribution of information recorded in optical recording media as software information has been promoted. The technology to prevent illegal copying thereof also has developed. Therefore, as so-called security measures, identification information is desired to be recorded respectively in optical recording media.

To meet this requirement, the technique generally applied to record identification information for optical recording media is, for example, to provide a pit part of a reproduction-only type optical recording medium with an additional area (Burst Cutting Area, hereinafter abbreviated as "BCA") where bar-codes are overwritten, so that identification information (ID) and, if necessary, an encryption key or a decryption key can be recorded in the BCA during the manufacturing process of optical recording media.

One example of recording signals in this BCA of a reproduction-only type optical recording medium is illustrated in FIG. 14. Specifically, as shown in FIG. 14(1), based on signals modulated according to predetermined identification information such as ID, a pulse-like laser beam is emitted in accordance with a pattern of the BCA so as to break and remove the reflection film of the optical recording medium at a stretch in a stripe form as illustrated in FIG. 14(2). The stripe-form BCA is formed on the optical recording medium with portions where the reflection film is broken and removed and with portions where the reflection film remains, as shown in FIG. 14(3). When this stripe-form BCA pattern is reproduced by an optical head of an optical information recording/reproduction device, the modulated signals show a waveform in which some portions are missing intermittently, since the reflection film has been removed in the BCA part. These missing portions in the waveform then undergo a filter process as shown in FIG. 14(5), and the digital reproduction data are detected as shown in FIG. 14(6). In this way, the identification information recorded on the optical recording medium can be obtained. By reading this identification information, each optical recording medium can be specified.

On the other hand, optical recording media are getting diversified more and more, and not only recording-type optical information recording media provided with an information layer capable of recording information signals have been developed, but also rewritable-type optical information recording media provided with an information layer capable of rewriting information signals freely. Since information can be recorded freely in this recording-type optical information recording medium as well as in this rewritable-type optical information recording medium (hereinafter referred to as an "optical disc" for both recording- and rewritable-types), it has become increasingly important to take the security aspect of information recorded in optical discs into consideration.

However, when the method for forming a BCA pattern by breaking and removing a reflective layer in a reproduction-only type optical recording medium is to be applied to an optical disc, the following problems arise.

First, in the information layer containing one of photoactive materials selected from pigment, magnetic materials and phase change type recording materials, the presence of information is detected by an optical change of the information layer itself. Therefore, even if the optical disc is provided with the reflective layer, an optical difference hardly can be detected by the BCA pattern in which only the reflective layer is removed. Thus, it is necessary to generate an optically detectable change of the information layer itself that can record information signals in optical discs.

Next, even if the method for forming a BCA pattern in a reproduction-only type optical recording medium is applied by emitting a laser beam pulse-like in accordance with the BCA pattern so as to break and remove the information layer in the optical disc, it is not possible to selectively break and remove only the information layer containing a photoactive material, since a laminated film such as an enhancement layer, a hard layer, an intermediate layer, or a dielectric layer is formed at least on one side of the information layer. As a result, the information layer and/or the laminated film in the vicinity of the boundary of the BCA pattern may be separated, or particle of the information layer and/or the laminated film arising inside the BCA pattern may cause distortion in forming the BCA pattern part, which leads to the problem that BCA signals cannot be obtained sufficiently due to noise mixed in the signals for detecting the BCA.

Furthermore, the defect caused by the separation of the information layer and/or the laminated film in the vicinity of the BCA pattern is not confined to the subsidiary information area but reaches the information layer and/or the laminated film of the main information area, which is a critical problem for the recording-type optical recording medium.

In particular, in the phase change type optical disc, after a light beam with a pulse modulated according to the information signal is emitted to the information layer to melt the information layer, the information layer is cooled, and thus, a recording mark is formed, so that information is recorded. Since the process of melting the information layer is included herein, for the purpose of suppressing the phenomenon of the pulsation or the float of the photoactive material of the information layer in the molten state, which causes changes in the recording characteristics, the configuration of providing the information layer with a material generally referred to as a dielectric, which has better thermomechanical characteristics than the materials comprising the information layer, is adopted in which the dielectric is present by contacting the information layer. Furthermore, the rewritable type optical disc in which the phase state changes reversibly has the configuration of holding the information layer between dielectrics.

The laminated film having the function of suppressing the phenomenon such as the pulsation and/or the float of the photoactive material in this information layer at the time of melting acts to hinder the formation of a BCA pattern when the BCA pattern is formed. If high energy is emitted forcibly to form a BCA pattern, due to the lack of the place for absorbing the impact such as boiling or evaporation of the photoactive material, the laminated film and/or the information layer may be separated, or bubbles, depressions and particles of the material of the information layer and/or the laminated film may be created inside the BCA pattern and in the peripheral portion thereof. Accordingly, the defect spreads to the subsidiary information area and also to the information layer in the main information area, thereby increasing the factors of causing critical defects that make it impossible to record.

Thus, it is difficult to record BCA patterns that can be detected exactly at least in the recordable type optical disc. One of the main reasons for the increase in the manufacturing costs of optical discs is the problem related to the formation of BCA patterns.

DISCLOSURE OF THE INVENTION

It is an object of the present invention to provide a method for recording a BCA stably in a recording type optical disc and also to provide an optical disc in which a BCA pattern is formed.

To solve the above problems, an optical recording medium of the present invention is a medium provided with a main information area capable of recording an information signal and a subsidiary information area for recording subsidiary information that is different from the information signal, which are divided in one principal plane direction of a substrate, wherein an information layer for recording the information signal in the main information area is provided also in the subsidiary information area, and medium identification information for distinguishing the medium optically is recorded in the information layer of the subsidiary information area without changing the shape of the information layer.

Furthermore, a recording method of an optical recording medium of the present invention uses an optical recording medium provided with a main information area capable of recording an information signal and a subsidiary information area for recording subsidiary information that is different from the information signal, which are divided in one principal plane direction of a substrate, wherein an information layer for recording the information signal in the main information is provided also in the subsidiary information area, and medium identification information for distinguishing the medium by an optical phase change is recorded in the information layer of the subsidiary information area. The recording method comprises: recording medium identification information optically in the information layer of the subsidiary information area, and recording an information signal optically in the main information area, wherein the medium identification information is recorded first and the information signal is recorded afterwards with a modulation method that is different from a light beam modulation method used for recording the medium identification information.

BRIEF DESCRIPTION OF THE DRAWINGS

FIG. 11(1) to 11(3) are views each showing an example of a wave form chart of a laser output in another example of recording medium identification information of the present invention, wherein FIG. 11(1) is a wave form chart of a laser output when medium identification information is recorded;

FIG. 11(2) is a wave form chart of a laser output during a phase conversion process; and FIG. 11(3) is a wave form chart of a laser output when medium identification information is recorded and the phase conversion process is performed at the same time.

FIG. 17(a) is a structural view of data for BCA, where n=1 and 12 bytes in an example of the present invention; and FIG. 17(b) is a structural view of virtual data created by adding 0 for an ECC operation for BCA, where n=1 and 12 bytes in an example of the present invention.

FIG. 18(a) is a structural view of data showing an example of synchronous codes of BCA of the present invention; and FIG. 18(b) is a structural view of data showing a fixed synchronous pattern of BCA in an example of the present invention.

BEST MODE FOR CARRYING OUT THE INVENTION

Figure 1:
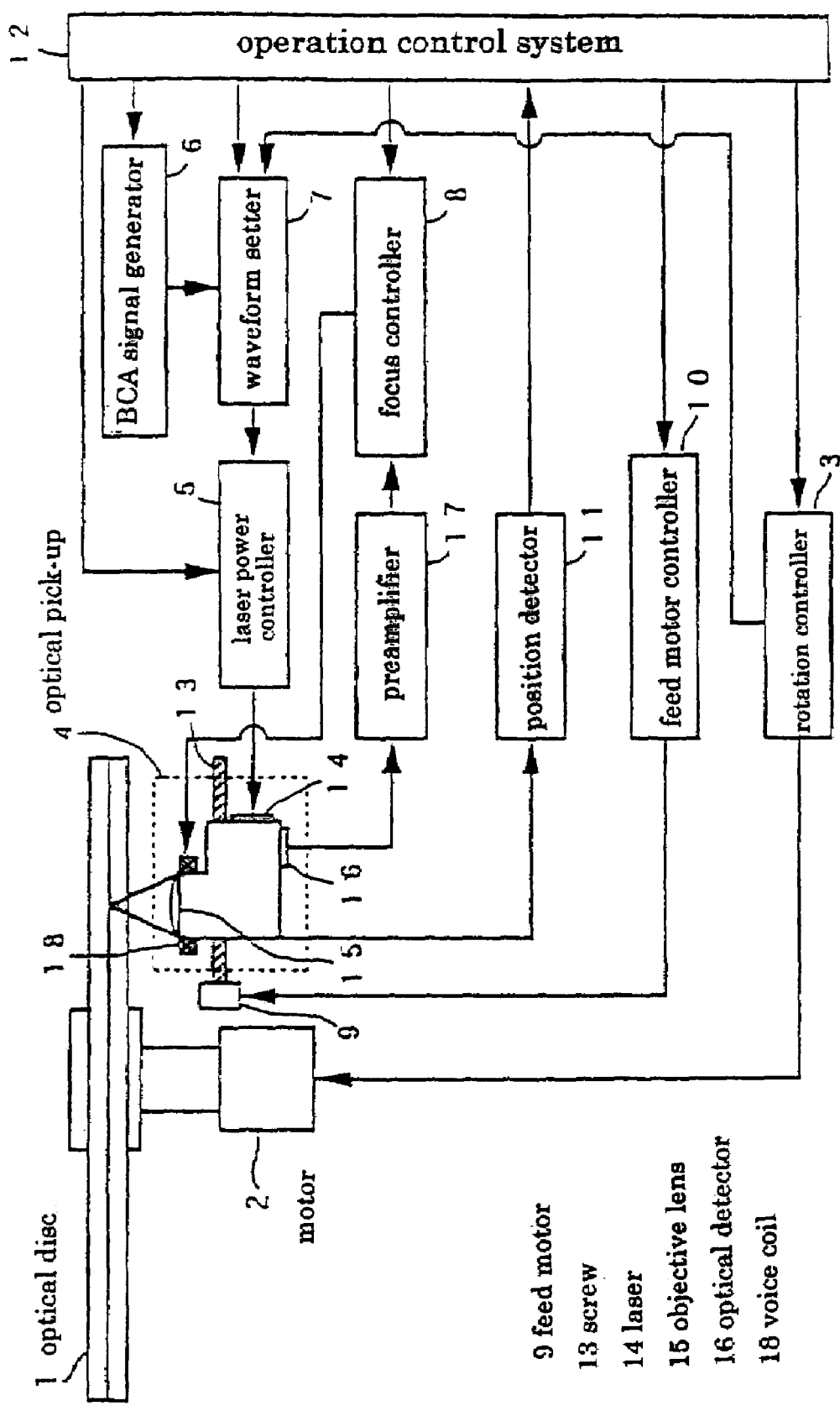
FIG. 1 is a block diagram showing one example of a recording device of the present invention.

The optical recording medium of the present invention has the configuration in which information layers for recording information signals are provided in both the main information area and the subsidiary information area, and subsidiary information to be recorded in the information layer of the subsidiary area is recorded without changing the shape of the information layer. When a pattern of medium identification information such as a BCA pattern is formed, the information layer particularly in the boundary portion of the BCA pattern causes unrecoverable defects such as separation or holes, and due to these defects, the information layer of the main information area also becomes incapable of recording. This is a critical problem for a recording type optical recording medium, but this problem can be solved by the configuration of the present invention described above. The information layer of the subsidiary information area that records subsidiary information without changing its shape can be made of, for example, optically active material such as pigment, magnetic materials, or phase change materials. According to the kind of the optically active material, for example, the recording may be performed by suitably selecting the energy intensity etc. of a light source and/or a heat source such as a laser beam. The shape change of the information layer referred to in the present invention does not include, for example, ultra-micro changes such as the shape change of the information layer accompanied with an atomic arrangement change between crystal and crystal or between amorphousness and crystal, the shape change of the information layer accompanied with the chemical change of a material contained in the information layer, and the like.

The information layer of the main information area may be configured to include a phase change type material, for example, so that the phase state of the medium identification information to be recorded in the information layer of the subsidiary information area and the phase state of the information layer of the main information area can be changed independently to control the phase state of the information layer in the respective areas. Alternatively, the portion for recording the medium identification information can be recorded with a phase that is different from the phase state of the information layer of the main information area.

A main constituent material of the information layer in the main information area and a main constituent material of the information layer in the subsidiary information area may be configured to be the same, so that the optical recording medium can be produced without changing the material constitution for the information layer of the subsidiary information area and the information layer of the main information area, so that the optical recording medium can be provided at a low price.

Furthermore, it may be configured such that, after the step of recording medium identification information is conducted, the step of recording an information signal with a modulation method that is different from a light beam modulation method used for the recording step of the medium identification information is conducted. Accordingly, the part where the medium identification information is recorded can be distinguished easily from the part where the information signal is to be recorded or is already recorded with a recording/reproduction device. In addition, the medium information in the part of the medium information signal can be recognized precisely.

Furthermore, it is preferable to configure the method such that, after the step of recording the medium identification information and the step of converting the phase are conducted, the step of recording the information signal in the information layer of the main information area is conducted, since, in the case where the information layer includes a magneto-optical recording material or a phase change recording material, the information signal can be recorded, reproduced and/or erased in the information layer of the main information area. Moreover, the step of recording the medium identification information and the step of converting the phase may be conducted at the same time, as will be described later. Alternatively, these two steps can be treated as two separate steps and the order of the above steps can be selected, if necessary, for example, to conduct the step of recording the medium identification information after the step of converting the phase is conducted, or vice versa.

It may be configured such that a power of a light beam with which the medium identification information is recorded to the information layer is reduced to be lower than a power of a light beam to be emitted to the information layer other than the medium identification information part, for example, when the information layer includes a material that changes its phase between amorphousness and crystal, the medium identification information can be recorded in the information layer in the state in which the film is formed (occupied mainly by the amorphous state), and the phase can be converted to the crystal state except for the part of the medium identification information. Thus, the medium identification information can be recorded with the use of an ordinary initial crystallization device.

Furthermore, when the medium identification information is recorded by emitting a light beam to the information layer, the light beam may be scanned such that a part of a spot of the light beam is overlapped by another spot in a main scanning direction of a circumferential direction of the spot and in a subsidiary scanning direction of a radial direction of the spot. For this purpose, the spot of the light beam having a narrower width than that of the medium identification signal in the circumferential direction and a shorter length than that of the medium identification signal in the radial direction may be used. In this way, the spot can be scanned so as to overlap in the main scanning direction and in the subsidiary scanning direction.

In particular, by appropriately controlling the relative travelling speed of the spot with the optical disc in the main scanning direction, the information layer in the part of the medium identification information can remain unevenly distributed in the molten state, so that it is possible also to pit the information layer as the medium identification information part formed in the reflective layer of the reproduction-only type optical recording medium. In this pitted part of the medium identification information, the information layer is unevenly distributed in the liquid state. Therefore, compared with the method for forming pits by emitting a light beam having the size of the part of the medium identification information, the problems such as the occurrence of particle etc. of the material contained in the information layer and/or the laminated film, or the separation of the information layer and/or the laminated film due to the impact caused by the evaporation or the like can be solved. Moreover, since the width of the spot of the light beam to be emitted to the part of the medium identification information in the main scanning direction and the width thereof in the subsidiary scanning direction, the power of the light beam and/or the relative speed between the light beam and the optical disc are dependent upon the material of the information layer in the optical disc and/or the constitution or the material of the laminated film around the information layer, these elements are selected suitably for use. Furthermore, the preferable configuration of forming the part of the medium identification information to be pitted is effective, for example, in preventing a user from tampering with the medium identification information. In this case, however, the shape of the information layer in the part of the medium identification information naturally is changed from the shape of other information layers.

In addition, the optical recording medium may be configured such that an amount of uneven distribution of the information layer in the subsidiary information area is larger in a vicinity of an end side of a back part in a rotation direction of the subsidiary information than in a vicinity of an end side of a front part of the subsidiary information in the rotation direction of the optical recording medium. Accordingly, it is possible to pit the part of the medium identification information, and the same optical characteristics as the medium identification information of a reproduction-only type recording medium can be obtained.

In the present invention, it is preferable that the optical recording medium is a disc-shaped medium, and the subsidiary information area is located along an inner peripheral surface of the lead-in area of the disc-shaped medium. This location is most suitable for recording medium identification information.

Furthermore, in the present invention, it is preferable that the subsidiary information area of a disc with a diameter of about 120 mm is present in the range between 22.3 mm and 23.5 mm from the center of the disc, so that the optical pick-up is not structurally limited by the motor and the actuator, the movable range of the optical pick-up is included, and the main information is not affected thereby. The above location is most suitable for recording medium identification information as mentioned above.

Moreover, it is preferable that the subsidiary information is recorded with an additional area (Burst Cutting Area) overwritten in the subsidiary information area such that either an amorphous state is to remain in the stripe form or a crystal state is to remain in the stripe form. When the amorphous state is to remain in the stripe form in the subsidiary information area, it is preferable that the phase of the main information area is changed continuously to the crystal state for initialization. The case of allowing the crystal state to remain in the stripe form in the subsidiary information area is convenient when a recording film that does not need to be initialized (as-depo) is used for the main information area. The as-depo film is crystallized from the beginning. However, by emitting the laser beam to such a degree that the recording film is not broken but has momentarily a high temperature, the as-depo film can be converted into an amorphous state.

In the above configuration, as for the recording film that is initialized by changing the phase of the main information area to the crystal state, chalcogenide based on Te or Se, for example, GeSbTe and GeTe can be used. Furthermore, the recording film which does not need to be initialized (as-depo) can be formed, for example, by slowly depositing GeSbTe of above chalcogenide by using the vapor phase thin film deposition such as the vacuum evaporation method.

In the above configuration, it is preferable that a phase changes between an amorphous state and a crystal state, and that the reflectivity in a crystal state is at least 10% higher than the reflectivity in an amorphous state. If a difference of 10% exists between the reflectivity, the recorded information can be distinguished surely.

Furthermore, it is preferable that the optical recording medium has a disc-shaped form, and when the medium identification information is recorded by emitting a light beam to the information layer, the light beam is scanned such that a part of a spot of the light beam is overlapped by another spot in a main scanning direction of a circumferential direction of the spot and in a subsidiary scanning direction of a radial direction of the spot, and that the overlapped part is determined to be the recorded information. According to this method, BCA signals can be formed without any break in the radial direction, and the recorded BCA signals can be reproduced by using the light beam that reproduces the main information.

Hereinafter, the present invention will be described by way of embodiments with reference to drawings. The following embodiments are described by using as the optical recording medium a rewritable type phase change optical disc in which the phase changes reversibly between amorphousness and crystal. However, the optical recording medium applicable to the present invention is not limited to the rewritable type phase change optical disc. For example, so-called magneto-optic materials such as alloys of rare earth element and transition metal and so-called recordable information layer materials such as pigment materials, i.e. cyanine dye, phthalocyanine dye etc. can be applied thereto. Furthermore, the phase change type material changes its phase between amorphousness and crystal or between crystal and crystal. Since this is a conventionally known material, the details thereof will be omitted herein. The material that changes its phase reversibly or irreversibly also can be used.

Embodiment 1

FIG. 1 is a block diagram showing an example of a device for recording medium identification information in an optical disc. It will be explained with regard to BCA as the medium identification information. The recording device of FIG. 1 includes a spindle motor 2 for rotating an optical disc 1, a rotation controller 3, an optical pick-up 4 for focusing light beams generated from a light source such as a laser, a laser power controller 5 for driving the light source of the optical pick-up 4, a BCA signal generator 6 for generating a BCA signal by modulating subsidiary information to be recorded on the optical disc, a waveform setter 7 for reshaping the laser modulation waveform based on the BCA signal, a focus controller 8 for focusing the light emitted from the optical pick-up 4 on the optical disc, a feed motor 9 for shifting the optical pick-up 4 and a feed motor controller 10, a position detector 11 for detecting the position of the optical pick-up 4, and an operation control system 12 for controlling the laser power controller 5, the rotation controller 3, the focus controller 8 and the feed motor controller 10 as a whole.

Figure 2:
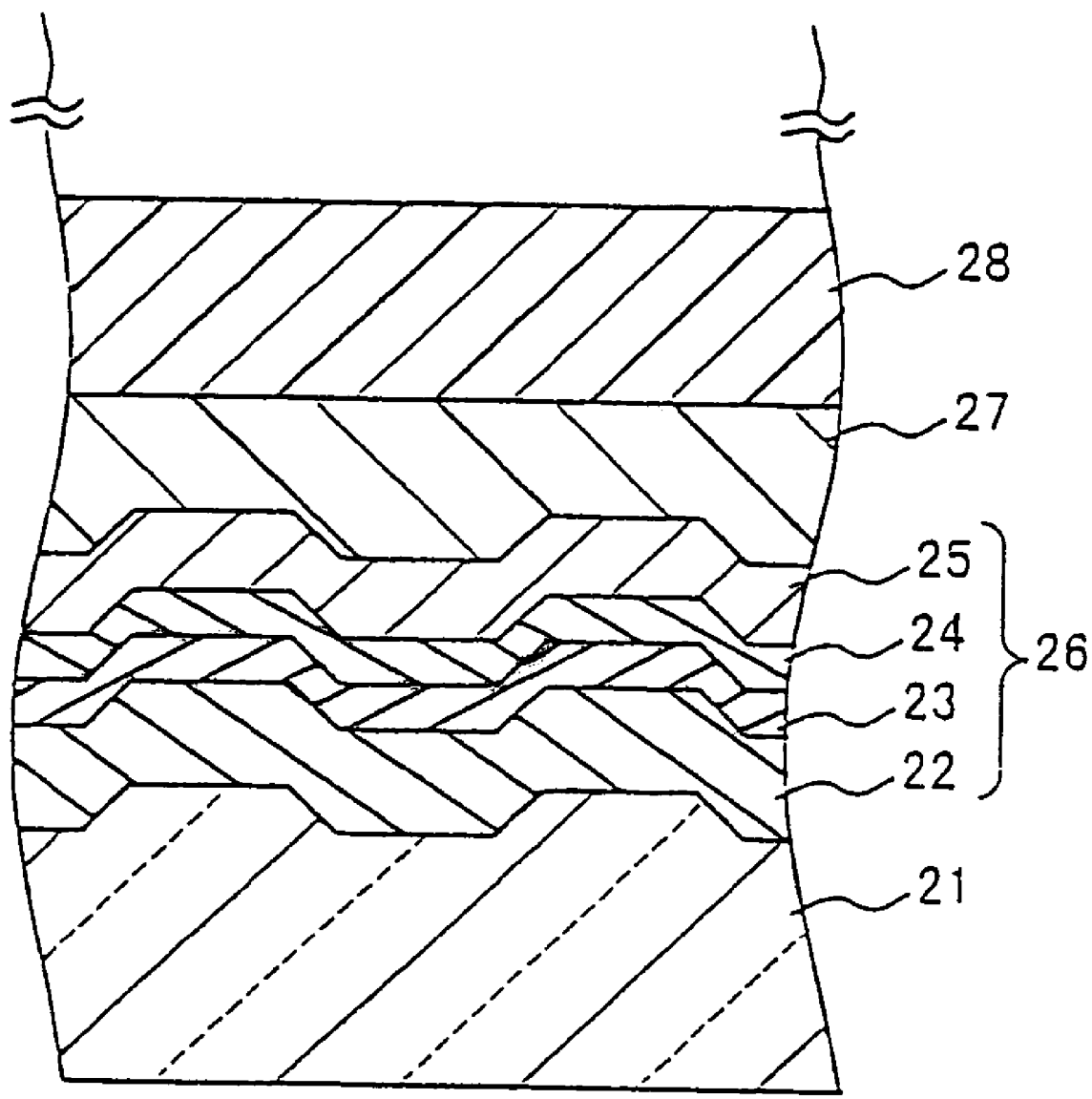
FIG. 2 is a cross-sectional structural view of an important part in an example of an optical disc applicable to the present invention.

FIG. 2 is a cross-sectional structural view showing the main part of a phase change type optical disc in an example of an optical disc applicable to the present invention. As illustrated in FIG. 2, a recording film 26 including a dielectric layer 22, a recording layer 23 (a so-called information layer), a dielectric layer 24 and a reflective layer 25 is applied onto one side of the principal plane of a transparent substrate 21. An ultraviolet curable resin or the like is applied thereto as a resin protection film 27 in contact with the recording film 26. A phase change type recording layer is provided as the recording layer 23 in which information can be recorded by using optical means to change the phase state of the recording layer. Two pieces of this substrate as one pair are glued together via an adhesive layer 28 to be finished as a single optical disc. Moreover, an optical disc configured symmetrically via the adhesive layer 28 naturally can be applied as well. The recording film 26 in the embodiment shown in FIG. 2 was formed by the sputtering method with the use of Zn—SiO$_2$ (thickness: 120 nm) as the dielectric layer 22, GeTeSb (thickness: 20 nm) as the recording layer 23, Zn—SiO$_2$ (thickness: 30 nm) as the dielectric layer 24, and an Al alloy (thickness: 90 nm) as the reflective layer 25.

Figure 3:
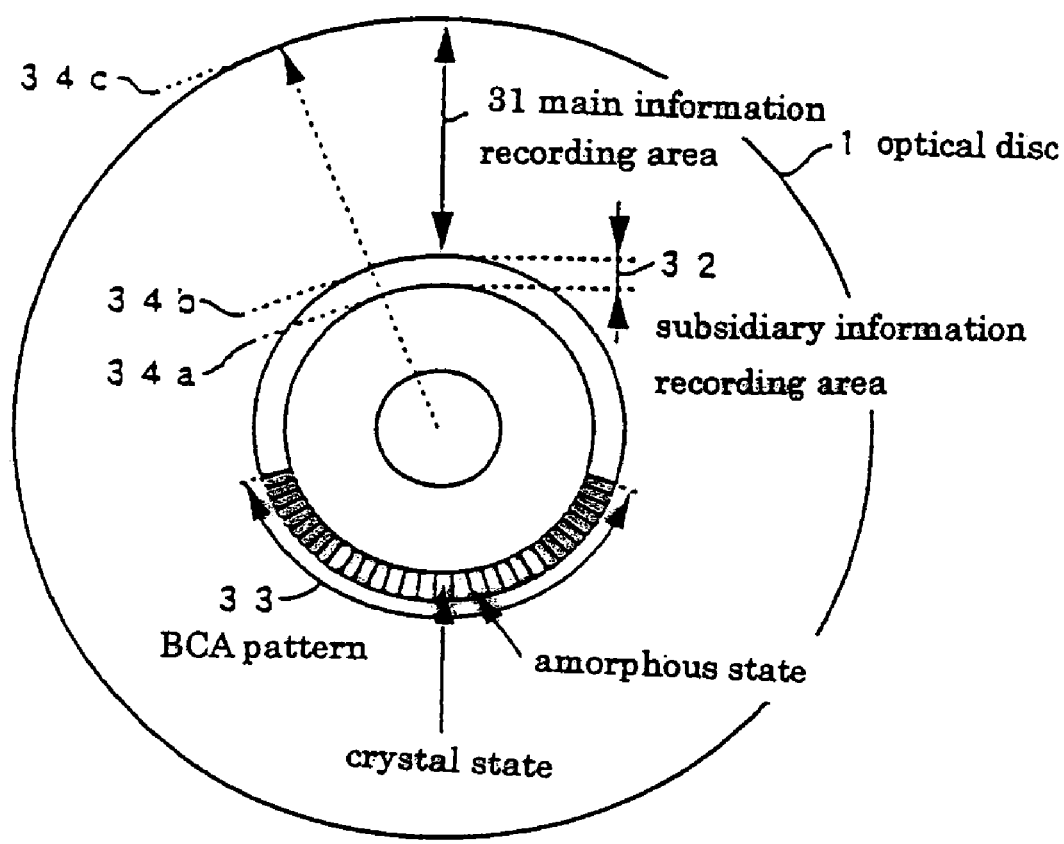
FIG. 3 is a top view showing an example of an optical disc applicable to the present invention.

FIG. 3 is the top view of the phase change type optical disc shown in FIG. 2. As illustrated in FIG. 3, there are a main information recording area 31 and a subsidiary information recording area 32 on the optical disc 1. The main information refers to the information that is recorded, reproduced, or erased by a user with an optical recording/reproduction device, whereas the subsidiary information refers to ID (identification information), an encryption key, a decryption key or the like that is different for each disc, which is recorded when the optical disc is manufactured. Hereinafter, the embodiments of the present invention will be explained on the basis of a BCA recording for recording the subsidiary information. Furthermore, the subsidiary information area includes a pit part formed by pitting in which position information and the like related to the main information is recorded besides the information described above. Generally, BCA is recorded in this area where pits are formed by partially overlapping with the recording layer. The subsidiary information recording area 32 is present in the range between 22.3 mm and 23.5 mm from the center of the optical disc 1. This area also is called a lead-in area. Furthermore, in the embodiment shown in FIG. 3, the subsidiary information recording area 32 was recorded by using a laser with a wavelength of 810 nm, and this subsidiary information recording area 32 was reproduced by using a laser with a wavelength of 660 nm. As a result, the reflectivity in the part of the crystal state was 16%, whereas the reflectivity in the part of the amorphous state was 2.5%.

Figure 4:
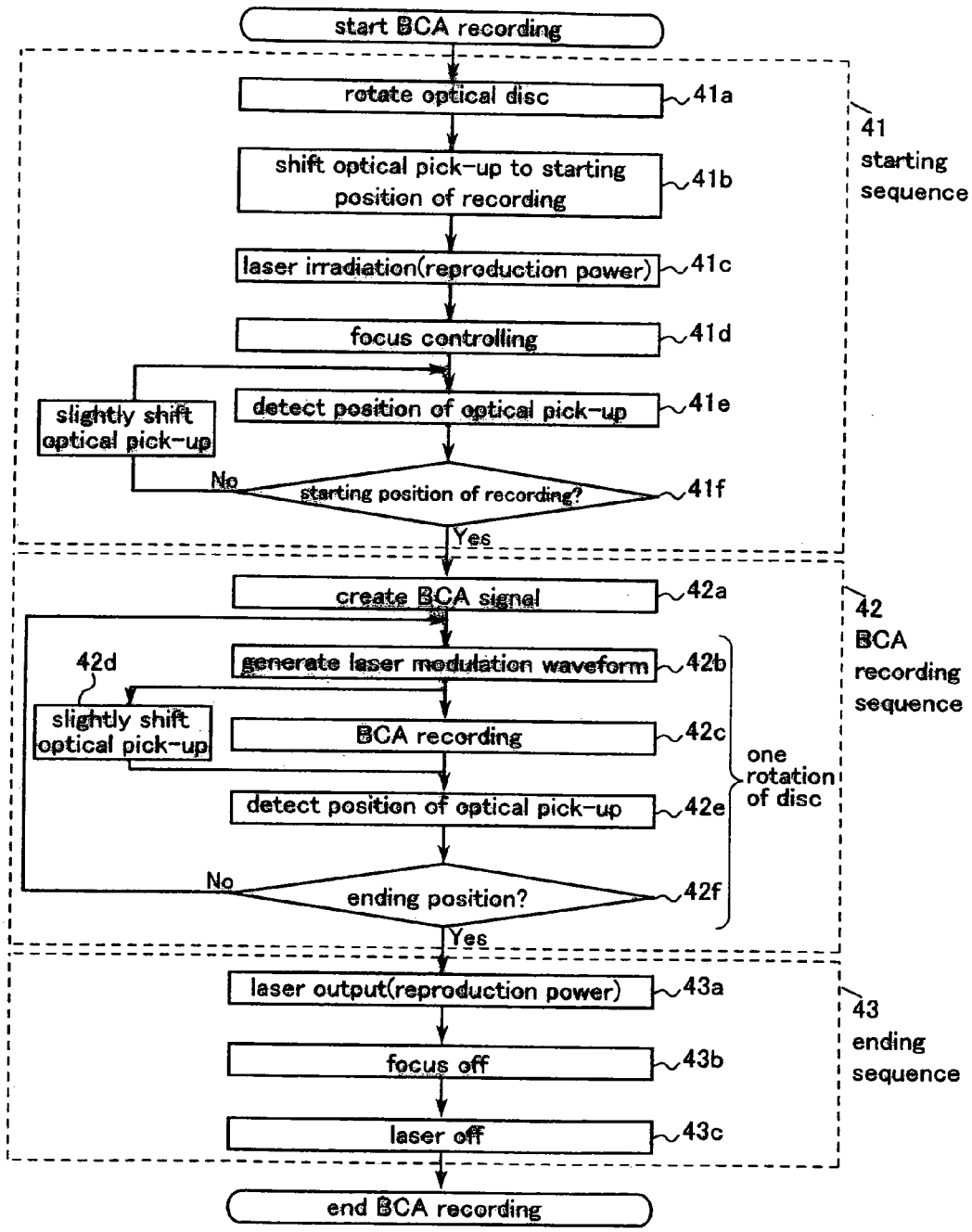
FIG. 4 is a flow chart showing an example of a method for recording medium identification information of the present invention.

FIG. 4 is a flow chart showing the process of recording BCA in a phase change type optical disc of the present invention. The process of recording BCA will be explained with reference to FIG. 4. The process of recording BCA is divided largely into three sequences: a starting sequence 41, a BCA recording sequence 42, and an ending sequence 43.

First, the starting sequence 41 will be explained. In the step 41a, the spindle motor 2 is driven by the rotation controller 3 according to the instruction given from the operation control system 12, and the optical disc 1 is rotated at a constant angular velocity (CAV state). In the step 41b, the feed motor 9 controlled by the feed motor controller 10 rotates screws 13 that support the optical pick-up 4, thereby shifting the optical pick-up 4 in the radial direction of the optical disc 1 to the starting position of subsidiary information recording. In the step 41c, based on the instruction given from the operation control system 12, the laser power controller 5 drives a high output laser 14 such as a semiconductor laser used as the light source. A light beam emitted from the laser 14 is directed through the optical system of the optical pick-up 4 and a final objective lens 15 to the optical disc. At this time, the power of light emitted from the laser 14 is of such a degree that the recording layer 23 of the optical disc 1 is not crystallized. In the step 41d, the focus controlling is performed in which the light beam emitted from the laser 14 is focused on the recording film of the optical disc 1. The light reflected from the optical disc 1 is detected by an optical detector 16 and output from the optical director 16 as an electric signal. This output signal is amplified by a preamplifier 17 and input to the focus controller 8. Based on the input signal from the optical detector, the focus controller 8 drives a voice coil 18 of the optical pick-up 4 so as to shift the objective lens 15 slightly in the vertical direction of the optical disc and thereby controls the light beam to be focused on the recording film. In the step 41e, the position detector 11 detects the position of the optical pick-up and transmits the position information to the operation control system 12. In the step 41f, based on the obtained position information, the operation control system 12 detects that the position of the light beam is located in the starting position of subsidiary information recording. Then, the operation control system 12 outputs a subsidiary information recording signal to the waveform setter 7 and also starts the BCA recording sequence 42. When the position of the light beam is not located in the starting position of subsidiary information recording, the operation control system 12 sends a signal to the feed motor controller 10, and the feed motor controller 10 drives the feed motor 9 based on this signal so as to shift the optical pick-up 4 slightly to the starting position of subsidiary information recording. Thereafter, the operation returns to the step 41e.

Figure 5:
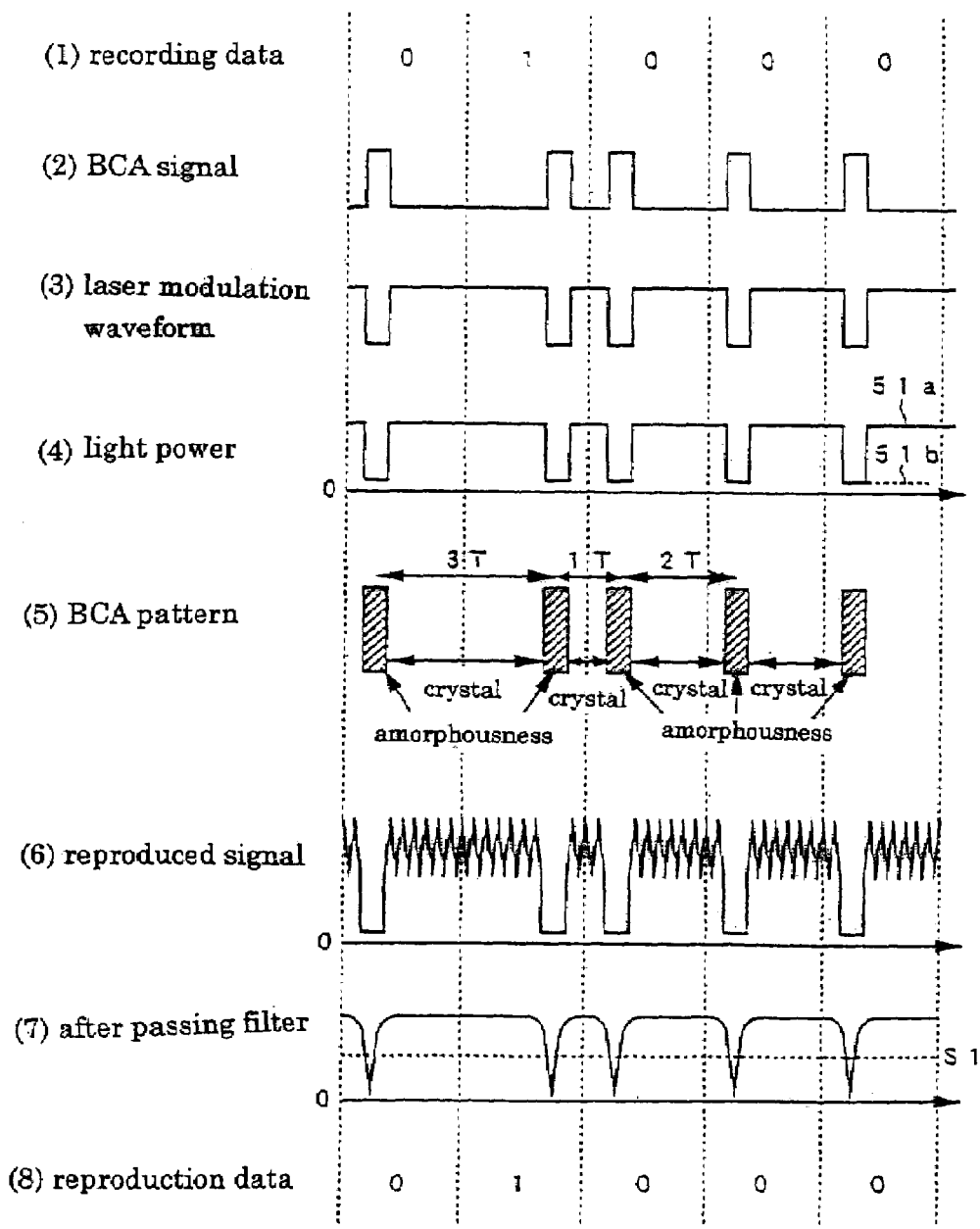
FIG. 5 is a view showing a timing chart in an example of a method for recording medium identification information of the present invention.

Next, the BCA recording sequence 42 will be explained. In the step 42a, as shown in FIG. 5(1), the recording data (subsidiary information) such as identification information to be recorded on the optical disc 1 is encoded so as to generate a BCA pattern (recording signal) as illustrated in FIG. 5(2). In the step 42b, the waveform setter 7 generates a laser modulation waveform based on the BCA pattern. Based on the BCA signal sent from the BCA signal generator 6 and the rotational frequency from the operation control system 12, the waveform setter 7 forms the laser modulation waveform, which is a reversed waveform of the BCA signal as shown in FIG. 5(3), by taking one rotation pulse signal from the rotation controller 3 as the timing. Furthermore, the waveform setter 7 outputs the laser modulation waveform in the case where a subsidiary information recording signal is input from the operation control system 12, and in the case where a subsidiary information recording signal is not input, a bias output is performed, which has a lower power than that of the subsidiary information recording signal, such as a reproduction output or the like. While the optical disc 1 rotates one cycle, the step 42c and the step 42d are performed at the same time. In the step 42c, BCA is recorded on the optical disc 1. The laser power controller 5 drives the laser based on the laser power value instructed by the operation control system 12 and the laser modulation waveform from the waveform setter 7, and the laser beam is output as illustrated in FIG. 5 (4). With regard to the light power of FIG. 5(4), the power 51a is a laser power capable of providing the necessary energy for crystallizing the recording film 26 of the optical disc 1, and the power 51b is power of such a degree that the recording layer 26 of the optical disc 1 is not crystallized (for example, reproduction power).

Next, with reference to FIG. 6, the step of recording BCA onto the optical disc 1 by the light power shown in FIG. 5(4) will be explained. A light beam 61 is focused on the recording film 26 of the optical disc 1 and is moved relatively on the optical disc 1 by rotating the optical disc 1 (the travelling direction of the optical disc 1 is indicated with the arrow in FIG. 6). Based on the laser modulation waveform generated by the waveform setter 7, the laser power controller 5 modulates the output power of the laser beam.

When the light power is 51a, the recording film 26 is crystallized. On the other hand, when the light power is 51b, the recording film 26 remains in the state in which the film was formed (mainly in the amorphous state), so that the recording film 26 is crystallized intermittently for recording BCA.

In the step 42d, while the optical disc 1 rotates one cycle, the optical pick-up 4 is shifted in the radial direction of the optical disc 1. By referring to FIG. 7, the process of recording a BCA pattern while shifting the optical pick-up will be explained. A focus spot 71 focused on the recording film 26 of the optical disc 1 has an oblong shape to the radial direction of the optical disc 1. A moving amount 72 of the optical pick-up 4 per one cycle of the spindle motor is equal to or smaller than the length 71a of the focus spot 71 in the radial direction. According to the instruction from the operation control system 12, the feed motor controller 10 drives the feed motor 9 and shifts the optical pick-up 4 so as to synchronize with the rotation of the spindle motor 2 at a constant speed. At the same time, as already described in the step 42c, the laser beam is modulated by taking one cycle pulse as a reference, so that a BCA pattern in the stripe form is formed in the subsidiary information recording area of the optical disc 1 according to the principle shown in FIG. 6.

In the step 42e, the position detector 11 detects the position of the optical pick-up and transmits the position information to the operation control system 12. In the step 42f, based on the obtained position information, the operation control system 12 detects that the position of the light beam is located inside the subsidiary information recording area. Then, the operation control system 12 outputs a subsidiary information recording signal to the waveform setter 7, and the operation returns to the step 42b. When the position of the light beam goes beyond the subsidiary information recording area, the operation moves on to the ending sequence 43.

Next, the ending sequence 43 will be explained. In the step 43a, the operation control system 12 sends a signal to the laser power controller 5 to return the light power to reproduction power. In the step 43b, the operation control system 12 sends a signal to the focus controller 8 to stop the focus controlling. In the step 43c, the operation control system 12 sends a signal to the laser power controller 5 to reduce the laser power to zero.

According to the method described above, BCA can be recorded by allowing the amorphous state in the stripe form to remain in the subsidiary information recording area of the optical disc 1 shown in FIG. 3.

Figure 14:
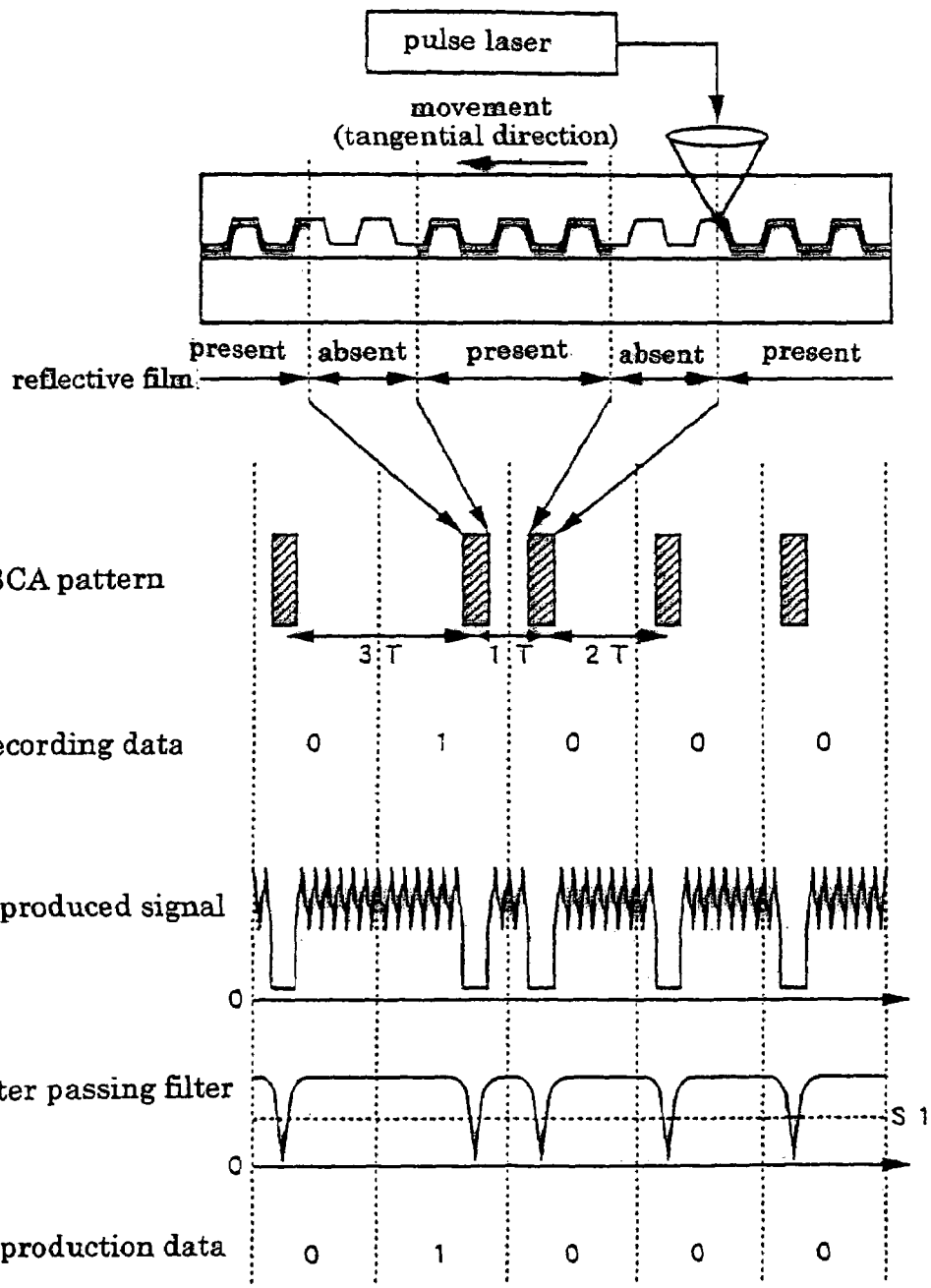
FIG. 14 is a view showing a timing chart of a method for BCA recording of medium identification information in a conventional example.

FIG. 5 shows a case in which the phase change type optical disc with BCA recorded according to the method described above is reproduced by using an ordinary optical information recording/reproduction device. In this case, the BCA pattern recorded on the optical disc is formed in the stripe form as in FIG. 5(5). When this stripe is reproduced with an optical head of an ordinary optical information recording/reproduction device, it is reproduced as in FIG. 5(6), since the part in the amorphous state has lower reflectivity than the crystal state. This reproduction signal is almost the same as the BCA reproduction signal in a conventional reproduction-only type optical recording medium illustrated in FIG. 14(4). By passing this reproduction signal through a low-pass filter, a signal such as FIG. 5(7) can be obtained, which then is level-sliced to obtain the reproduction data such as FIG. 5(8).

In this embodiment, the laser modulation waveform in the waveform setter was generated by taking one cycle pulse signal from the spindle motor 2 as the reference, but there is another method of setting the generation timing of the intermittent pulse by providing the spindle motor 2 with a rotary encoder and taking the turning angle signal of the optical disc 1 detected by this rotary encoder as the reference. According to this method, BCA recording position errors caused by the rotational fluctuation of the spindle motor 2 or the like can be reduced, and furthermore, the BCA recording can improve its position accuracy.

In this embodiment, the rotation of the optical disc 1 is explained by setting the state at a constant angular velocity (CAV), but there is another method of setting the rotation of the optical disc 1 at a constant linear velocity (CLV) by providing the spindle motor 2 with a rotary encoder and taking the turning angle signal of the optical disc 1 detected by this rotary encoder as the reference. According to this method, the laser power for the crystallization of the recording film can be regulated to be of a constant intensity, therefore, there is also no time difference of crystallization by the linear velocity change. As a result, a stable crystal state can be obtained.

Figure 6:
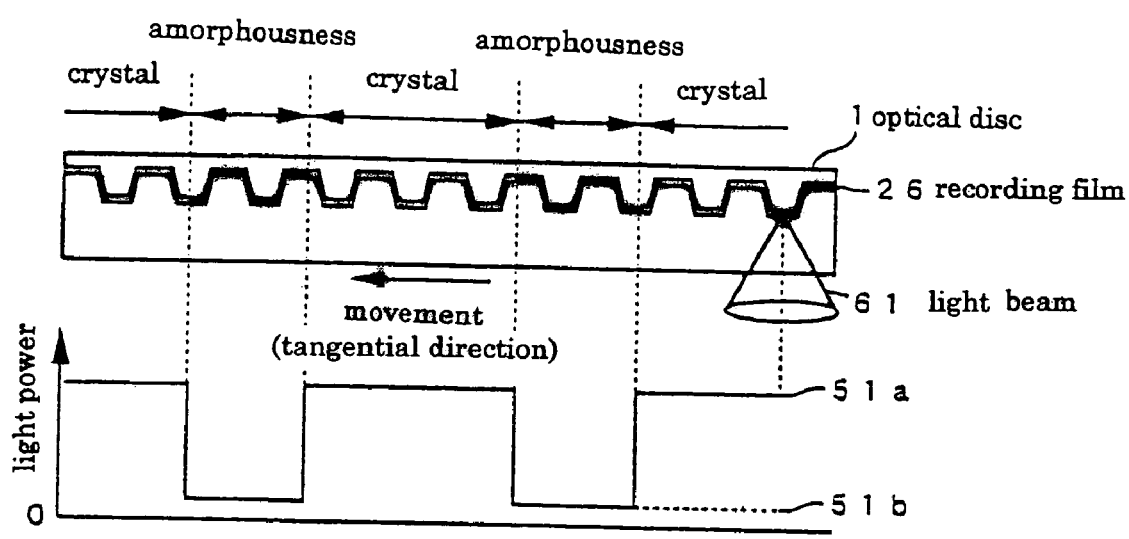
FIG. 6 is a view showing an example of a method for recording medium identification information of the present invention.

In this embodiment, the laser output for allowing the crystallization to be intermittent is explained by using a rectangular waveform as in FIG. 6, but there is another method of setting the laser power to be a multi-pulse waveform. According to this method, the heating value given to the disc surface by the laser beam can be controlled to an amount that is necessary for crystallizing only the crystallization area. Furthermore, the crystallization area can be prevented from spreading by the residual heat, so that an optimal state of BCA recording can be obtained.

Embodiment 2

Figure 8:
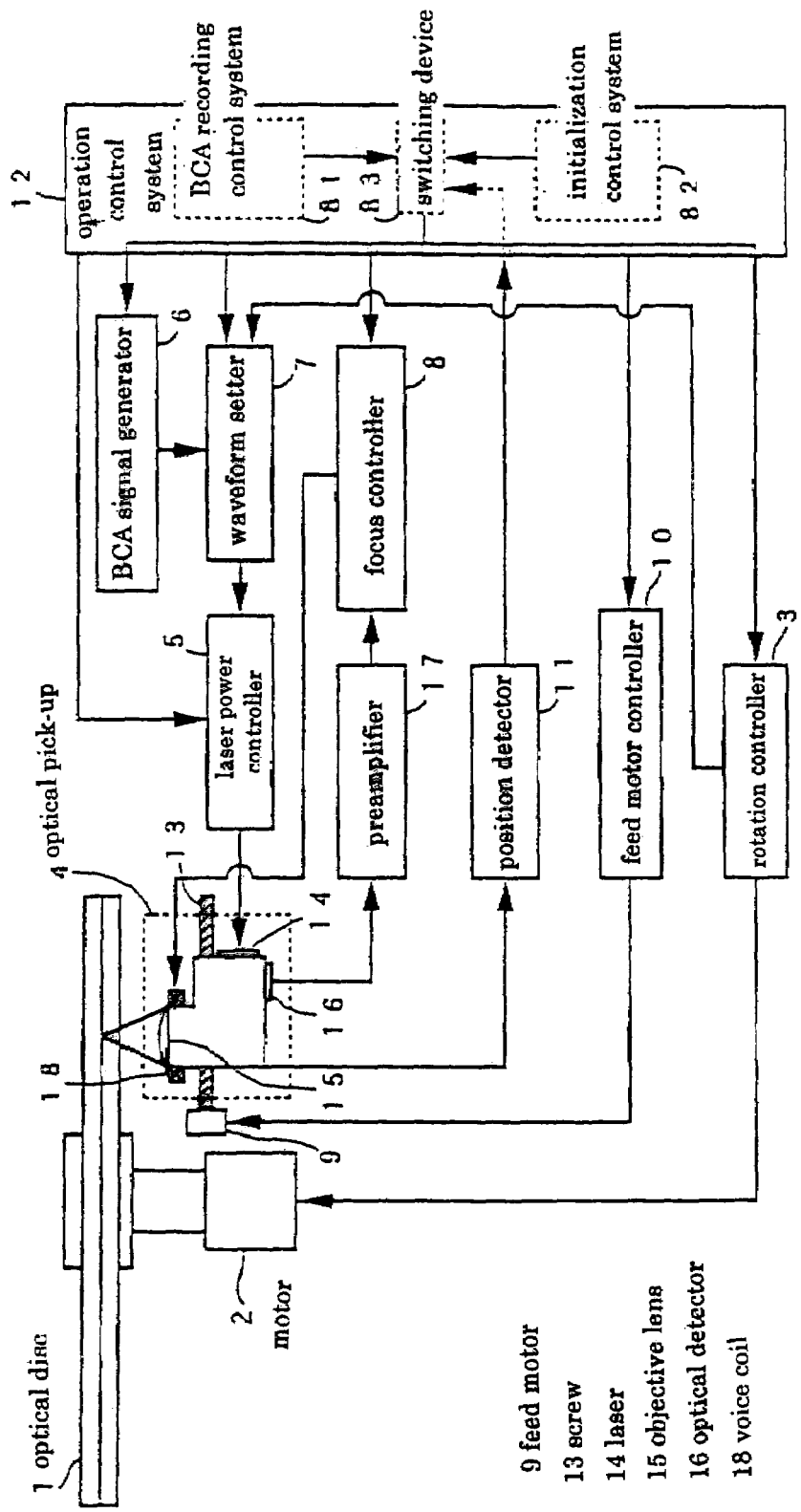
FIG. 8 is a block diagram showing another example of a recording device of the present invention.

FIG. 8 is a block diagram showing the configuration of a BCA recording device of the present invention, which is capable of recording BCA in an optical disc and also of initializing the optical disc continuously. This recording device is characterized in that the BCA recording and the initialization of the optical disc 1 can be performed continuously by adding a BCA recording control system 81, an initialization control system 82 and a switching device 83 for switching the respective control system in accordance with the situation to the BCA recording device illustrated in FIG. 1. This switching device 83 of the BCA recording and the initialization is operated according to the signal sent from the position detector 11, in which the switching device allows the BCA recording control system to take the control of the system when the position of the light beam is within the subsidiary information recording area, whereas the switching device allows the initialization control system to take the control of the system when the position of the light beam goes beyond the subsidiary information recording area.

Figure 9:
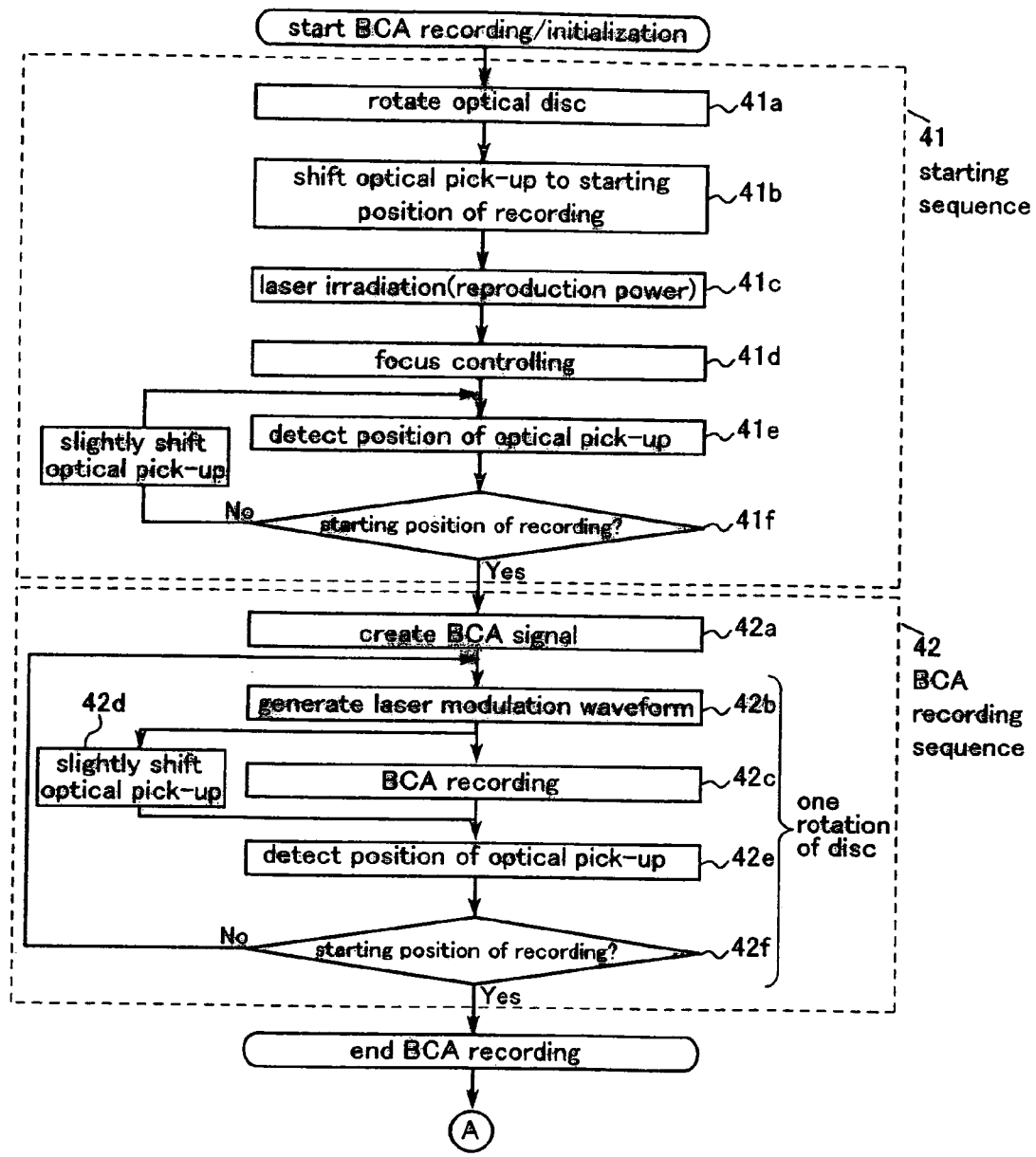
FIG. 9 is a flow chart showing another example of a method for recording medium identification information of the present invention.
Figure 10:
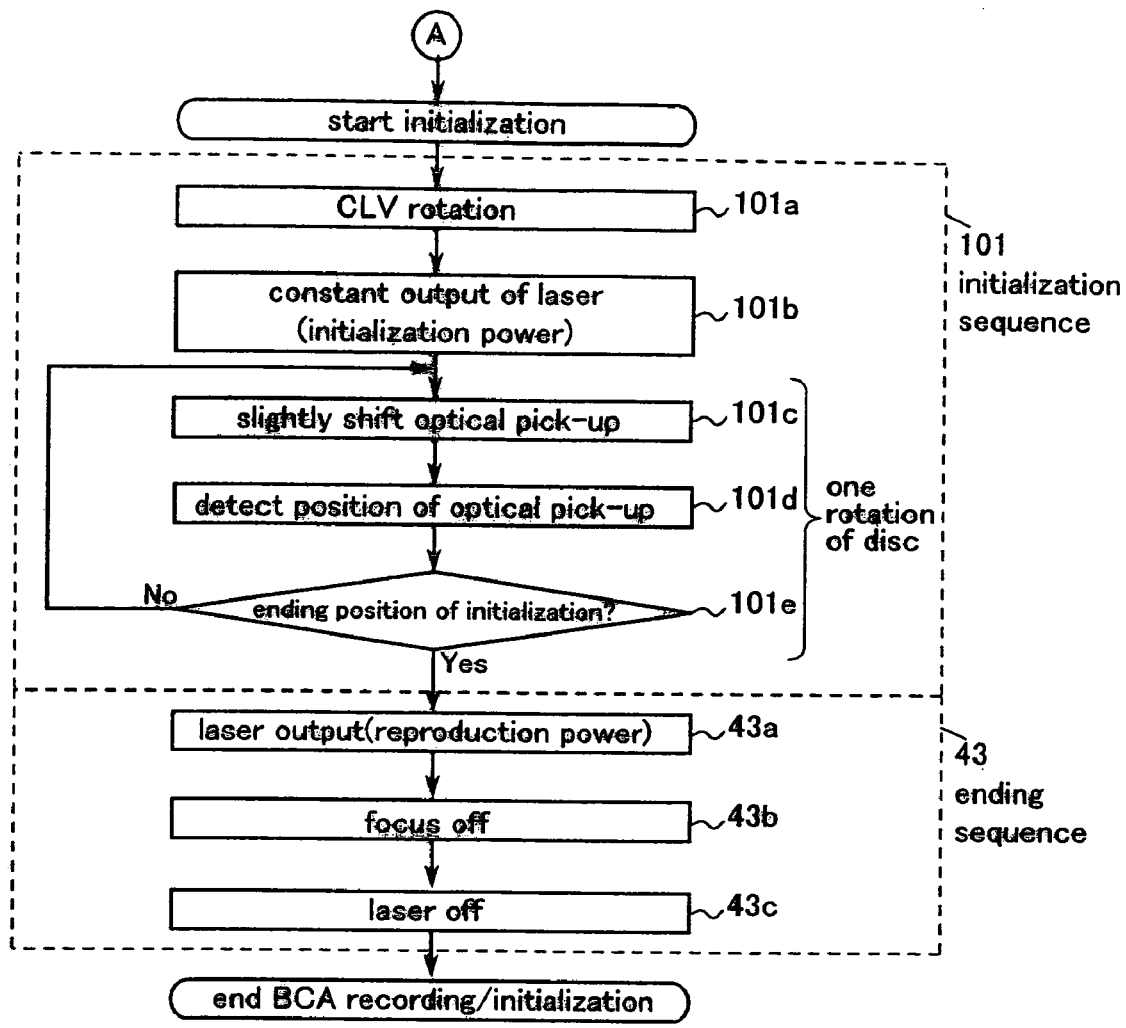
FIG. 10 is a flow chart of the above recording method.

With reference to the flow charts of FIG. 9 and FIG. 10, the actual operation of this device will be explained below in an example in which the initialization is performed in the CLV state after the BCA recording is performed in the CAV state. The process for this device is divided largely into four sequences: a starting sequence 41, a BCA recording sequence 42, an initialization sequence 91, and an ending sequence 43. In the present embodiment, the starting position of subsidiary information recording is determined to be a radial position 34a in FIG. 3, and the ending position of subsidiary information recording is determined to be a radial position 34b in FIG. 3. In addition, the starting position of initialization is determined to be the radial position 34b in FIG. 3, and the ending position of initialization is determined to be a radial position 34c in FIG. 3.

First, the starting sequence 41 will be explained. In the step 41a, the spindle motor 2 is driven by the rotation controller 3 according to the instruction given from the operation control system 12, and the optical disc 1 is rotated at a constant angular velocity (CAV state). In the step 41b, the feed motor 9 rotates the screws 13 that support the optical pick-up 4, thereby shifting the optical pick-up 4 in the radial direction of the optical disc 1 to the starting position of subsidiary information recording. In the step 41c, based on the instruction given from the operation control system 12, the laser power controller 5 drives the laser 14. A light beam emitted from the laser 14 is directed through the optical system of the optical pick-up 4 and the final objective lens 15 to the optical disc. At this time, the power of light emitted from the laser 14 is of such a degree that the recording layer 23 of the optical disc 1 is not crystallized. In the step 41d, the focus controlling is performed in which the light beam emitted from the laser 14 is focused on the recording film of the optical disc 1. In the step 41e, the position detector 11 detects the position of the optical pick-up and transmits the position information to the operation control system 12. In the step 41f, based on the obtained position information, the operation control system 12 detects that the position of the light beam is located in the starting position of subsidiary information recording. Then, the operation control system 12 outputs a subsidiary information recording signal to the waveform setter 7 and also starts the BCA recording sequence 42. When the position of the light beam is not located in the starting position of subsidiary information recording, the operation control system 12 sends a signal to the feed motor controller 16, and the feed motor controller 10 drives the feed motor 9 based on this signal so as to shift the optical pick-up 4 slightly to the starting position of subsidiary information recording. Thereafter, the operation returns to the step 41e.

Next, the BCA recording sequence 42 will be explained. In the step 42a, the recording data (subsidiary information) to be recorded on the optical disc 1 such as identification information is encoded so as to generate a BCA pattern (recording signal). In the step 42b, the waveform setter 7 generates a laser modulation waveform based on the BCA pattern. On the basis of the BCA signal sent from the BCA signal generator 6 and also of the rotational frequency from the operation control system 12, the waveform setter 7 forms the laser modulation waveform, which is a reversed waveform of the BCA signal, by taking one rotation pulse signal from the rotation controller 3 as the timing. Furthermore, the waveform setter 7 outputs the laser modulation waveform in the case where a subsidiary information recording signal is input from the operation control system 12, and in the case where a subsidiary information recording signal is not input, a bias output is performed. While the optical disc 1 rotates one cycle, the step 42c and the step 42d are performed at the same time.

In the step 42c, BCA is recorded on the optical disc 1. The laser power controller 5 drives the laser based on the laser power value instructed by the operation control system 12 and the laser modulation waveform from the waveform setter 7, and the laser beam is output as illustrated in FIG. 5 (4). With regard to the light power in FIG. 5(4), the power 51a is a laser power capable of providing the necessary energy for crystallizing the recording film 26 of the optical disc 1, and the power 51b is power of such a degree that the recording layer 26 of the optical disc 1 is not crystallized (for example, reproduction power). As illustrated in FIG. 6, by emitting this modulated light beam to the recording film of the optical disc 1, the recording film 26 is crystallized intermittently so as to record BCA.

Figure 7:
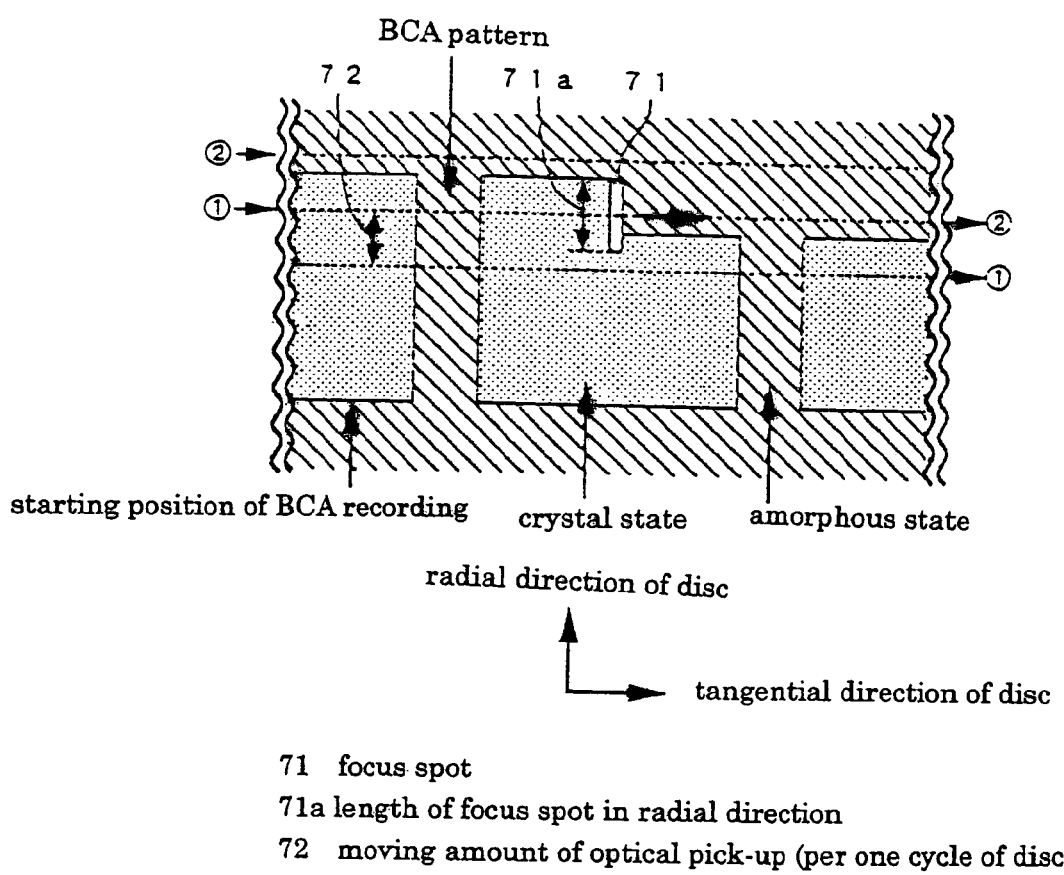
FIG. 7 is a top view showing the above recording method.

In the step 42d, while the optical disc 1 rotates one cycle, the optical pick-up 4 is shifted for a predetermined amount in the radial direction of the optical disc 1 at a constant speed, as illustrated in FIG. 7. By performing the step 42c and the step 42d at the same time, a BCA pattern in the stripe form is formed in the subsidiary information recording area of the optical disc 1.

In the step 42e, the position detector 11 detects the position of the optical pick-up and transmits the position information to the operation control system 12. In the step 42f, based on the obtained position information, the operation control system 12 detects that the position of the light beam is located inside the subsidiary information recording area. Then, the operation control system 12 outputs a subsidiary information recording signal to the waveform setter 7, and the operation returns to the step 42b. When the position of the light beam goes beyond the subsidiary information recording area, the operation moves on to the initialization sequence 91 shown in FIG. 10.

Next, the initialization sequence 91 will be explained. When the position of the light beam moves out from the subsidiary information recording area to the initialization area, the switching device 83 allows the initialization control system to take control of the system. In the step 91a, the operation control system 12 sends a signal to the rotation controller to switch the rotational condition from the CAV state to the CLV state. In the step 91b, the operation control system 12 sends a signal to the laser power controller 5, and the laser power controller 5 controls the laser power such that a constant power necessary for the recording film 26 of the optical disc 1 to be crystallized is provided for a predetermined linear velocity. In the step 91c, while the optical disc 1 rotates one cycle, the feed motor controller 10 drives the feed motor 9 to shift the optical pick-up by a predetermined amount. In the step 91d, the position detector 11 detects the position of the optical pick-up and transmits the position information to the operation control system 12. Based on the obtained position information, the operation control system 12 detects that the position of the light beam is located inside the initialization area, and the operation returns to the step 91c. When the position of the light beam goes beyond the initialization area, the operation moves on to the ending sequence 43.

Next, the ending sequence 43 will be explained. In the step 43a, the operation control system 12 sends a signal to the laser power controller 5 to return the light power to reproduction power. In the step 43b, the operation control system 12 sends a signal to the focus controller 8 to stop the focus control. In the step 43c, the operation control system 12 sends a signal to the laser power controller 5 to reduce the laser power to zero.

According to the operation described above, after BCA is recorded in the subsidiary information recording area on the optical disc 1 by changing the phase state of the recording film 26, the optical disc 1 can be initialized continuously, so that the manufacturing process can be simplified.

Furthermore, although Embodiment 2 is described by referring to the case in which the initialization is performed in the CLV state after the BCA recording is performed in the CAV state, it is also possible to record BCA after the initialization process. Moreover, it is also possible to perform the BCA recording and the initialization continuously in the CAV state alone by controlling the laser power intensity in conformity with the linear velocity. In addition, the BCA recording and the initialization can be performed continuously in the CLV state alone by attaching a rotary encoder to the spindle motor and generating a laser modulation signal during the BCA recording with reference to the turning angle signal of the optical disc 1 to be detected by the rotary encoder.

Embodiment 3

With the use of the device shown in FIG. 8, a method for recording a BCA pattern by providing a through hole that penetrates a recording layer and/or a recording film or a depression hole (hereinafter referred to as a hole) will be explained. According to the present invention, compared with the conventional method for recording a BCA pattern by using one laser emission for one BCA pattern, a light beam is emitted for several times to form a light spot that is sufficiently smaller than the BCA pattern, so that the thermal influence and the thermal damage to the recording film and to its peripheral portion can be reduced, thereby forming excellent holes (BCA patterns). Furthermore, as illustrated in FIG. 11, this method can be accomplished by increasing the power of the laser beam to such a power 111a that the film starts to break in the part of BCA recording. According to this method, it is possible to initialize the optical disc and also to record BCA by making holes in the recording film as in the conventional method.

Figure 12:
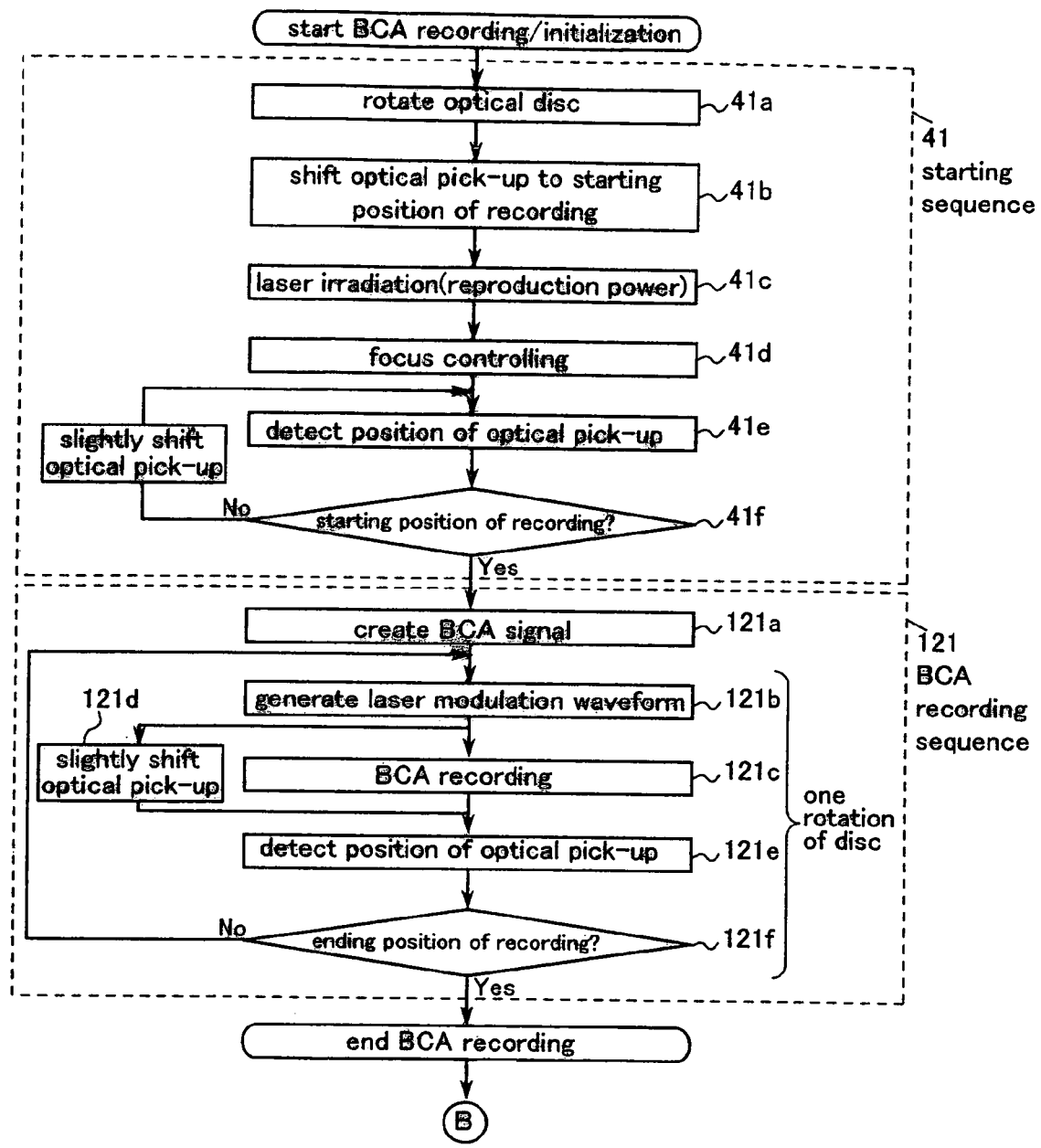
FIG. 12 is a flow chart showing yet another example of a method for recording medium identification information of the present invention.
Figure 13:
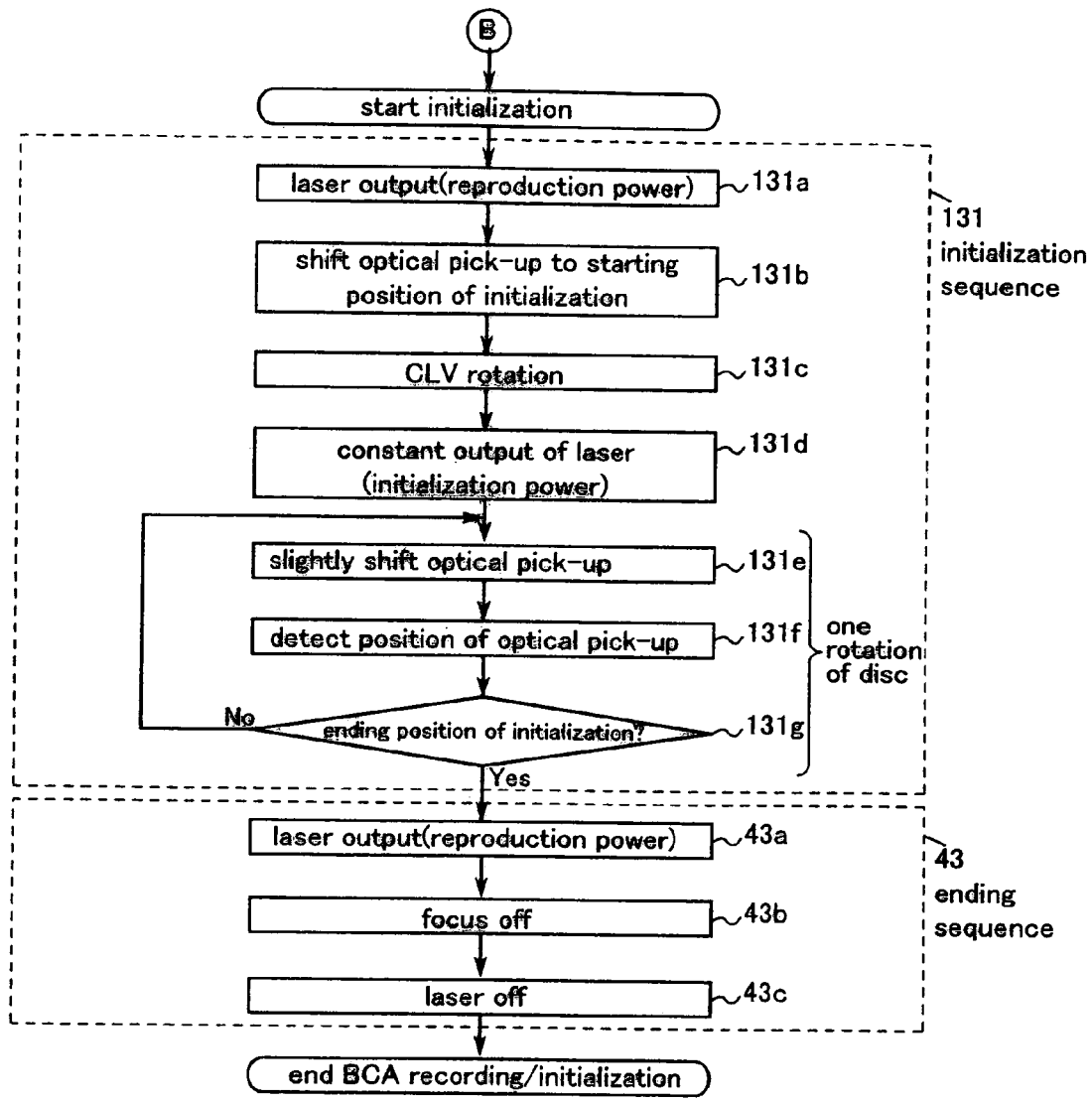
FIG. 13 is a flow chart of the above recording method.

With reference to the flow charts of FIG. 12 and FIG. 13, the actual operation of this device will be explained below in an example in which the initialization is performed in the CLV state after the BCA recording was performed in the CAV state. The process for this device is divided largely into four sequences: a starting sequence 41, a BCA recording sequence 121, an initialization sequence 131, and an ending sequence 43. Moreover, the starting position of subsidiary information recording is determined to be a radial position 34a in FIG. 3, and the ending position of subsidiary information recording is determined to be a radial position 34b in FIG. 3. In addition, the starting position of initialization is determined to be a radial position 34a in FIG. 3, and the ending position of initialization is determined to be a radial position 34c in FIG. 3.

First, the starting sequence 41 will be explained. In the step 41a, the spindle motor 2 is driven by the rotation controller 3 according to the instruction given from the operation control system 12, and the optical disc 1 is rotated at a constant angular velocity (CAV state). In the step 41b, the feed motor 9 rotates the screws 13 that support the optical pick-up 4, thereby shifting the optical pick-up 4 in the radial direction of the optical disc 1 to the starting position of subsidiary information recording. In the step 41c, based on the instruction given from the operation control system 12, the laser power controller 5 drives the laser 14. A light beam emitted from the laser 14 is directed through the optical system of the optical pick-up 4 and the final objective lens 15 to the optical disc. At this time, the power of light emitted from the laser 14 is of such a degree that the recording layer 23 of the optical disc 1 is not crystallized. In the step 41d, the focus controlling is performed in which the light beam emitted from the laser 14 is focused on the recording film of the optical disc 1. In the step 41e, the position detector 11 detects the position of the optical pick-up and transmits the position information to the operation control system 12. In the step 41f, based on the obtained position information, the operation control system 12 detects that the position of the light beam is located in the starting position of subsidiary information recording. Then, the operation control system 12 outputs a subsidiary information recording signal to the waveform setter 7 and also starts the BCA recording sequence 42. When the position of the light beam is not located in the starting position of subsidiary information recording, the operation control system 12 sends a signal to the feed motor controller 10, and the feed motor controller 10 drives the feed motor 9 based on this signal so as to shift the optical pick-up 4 slightly to the starting position of subsidiary information recording. Thereafter, the operation returns to the step 41e.

Next, the BCA recording sequence 121 will be explained. In the step 121a, the recording data (subsidiary information) to be recorded on the optical disc 1 such as identification information is encoded to generate a BCA pattern (recording signal). In the step 121b, the waveform setter 7 generates a laser modulation waveform based on the BCA pattern. On the basis of the BCA signal sent from the BCA signal generator 6 and also of the rotational frequency from the operation control system 12, the waveform setter 7 forms the laser modulation waveform by taking one rotation pulse signal from the rotation controller 3 as the timing. Furthermore, the waveform setter 7 outputs a laser modulation waveform in the case where a subsidiary information recording signal is input from the operation control system 12, and in the case where a subsidiary information recording signal is not input, a bias output is performed. While the optical disc 1 rotates one cycle, the step 121c and the step 121d are performed at the same time. In the step 121c, BCA is recorded on the optical disc 1. The laser power controller 5 drives the laser based on the laser power value instructed by the operation control system 12 and the laser modulation waveform from the waveform setter 7, and the laser beam is output as illustrated in FIG. 11(1). With regard to the light power in FIG. 11(1), the power 111a is a laser power capable of providing the necessary energy for breaking the recording film 26 of the optical disc 1 and making holes therein, and the power 111b is power of such a degree that the recording layer 26 of the optical disc 1 is not crystallized (for example, reproduction power). By emitting this modulated light beam to the recording film of the optical disc 1, holes are formed intermittently in the recording layer and/or the recording film so as to record BCA.

In the step 121d, while the optical disc 1 rotates one cycle, the optical pick-up 4 is shifted for a predetermined amount in the radial direction of the optical disc 1 at a constant speed. By performing the step 121c and the step 121d at the same time, a BCA pattern in the stripe form is formed in the subsidiary information recording area of the optical disc 1. In the step 121e, the position detector 11 detects the position of the optical pick-up and transmits the position information to the operation control system 12. In the step 121f, based on the obtained position information, the operation control system 12 detects that the position of the light beam is located inside the subsidiary information recording area. Then, the operation control system 12 outputs a subsidiary information recording signal to the waveform setter 7, and the operation returns to the step 121b. When the position of the light beam goes beyond the subsidiary information recording area, the operation moves on to the initialization sequence 131 shown in FIG. 13.

Next, the initialization sequence 131 will be explained. When the position of the light beam moves out from the subsidiary information recording area, the switching device 83 allows the initialization control system to take the control of the system. In the step 131a, the operation control system 12 sends a signal to the laser power controller 5 and returns the laser power to reproduction power. In the step 131b, the optical pick-up 4 is shifted in the radial direction of the optical disc 1 to the starting position of initialization.

In the step 131c, the operation control system 12 sends a signal to the rotation controller to switch the rotational condition from the CAV state to the CLV state. In the step 131d, the operation control system 12 sends a signal to the laser power controller 5, and the laser power controller 5 controls the laser power such that a constant power necessary for the recording film 26 of the optical disc 1 to be crystallized is provided to a predetermined linear velocity. In the step 131e, while the optical disc 1 rotates one cycle, the feed motor controller 10 drives the feed motor 9 to shift the optical pick-up by a predetermined amount. In the step 131f, the position detector 11 detects the position of the optical pick-up and transmits the position information to the operation control system 12. Based on the obtained position information, the operation control system 12 detects that the position of the light beam is located inside the initialization area, and the operation returns to the step 131e. When the position of the light beam goes beyond the initialization area, the operation moves on to the ending sequence 43.

Next, the ending sequence 43 will be explained. In the step 43a, the operation control system 12 sends a signal to the laser power controller 5 to return the light power to reproduction power. In the step 43b, the operation control system 12 sends a signal to the focus controller 8 to stop the focus control. In the step 43c, the operation control system 12 sends a signal to the laser power controller 5 to reduce the laser power to zero.

According to the operation described above, after BCA is recorded in the subsidiary information recording area on the optical disc 1 by making holes in the recording film 26, the optical disc 1 can be initialized successively, so that the manufacturing process can be simplified.

In this embodiment, with respect to the BCA recording waveform, the laser power is determined to be the reproduction power other than for the part of BCA recording as in FIG. 11(1). However, there is another method of determining the starting position of initialization to be the radial position 34b of FIG. 3 and determining the laser power to be the initialization power besides the part of BCA recording as in FIG. 11(3). According to this method, the initialization area is reduced, so that the processing capability can be improved.

Furthermore, although Embodiment 3 is described by referring to the case in which the initialization is performed in the CLV state after the BCA recording is performed in the CAV state, it is also possible to record BCA after the initialization process. Moreover, it is also possible to perform the BCA recording and the initialization continuously in the CAV state alone by controlling the laser power intensity in conformity with the linear velocity. In addition, the BCA recording and the initialization also can be performed continuously in the CLV state alone by attaching a rotary encoder to the spindle motor and generating a laser modulation signal during the BCA recording with reference to the turning angle signal of the optical disc 1 to be detected by the rotary encoder.

The configuration of making holes in the recording layer and/or the recording film as described in Embodiment 3 above is effective in preventing a user from tampering with the medium identification information without permission. In addition, the effect of forming the same medium identification information as the reproduction-only type optical recording medium can be obtained.

Moreover, although Embodiment 3 is described by referring to the case in which holes are provided in the recording layer and/or the recording film for recording medium identification information, the present recording method also is applicable to the recording layer and/or recording film in the main information area. This method, when applied to the main information area, can prevent a part of information from being tampered even as a rewritable type optical disc, so that the recording method capable of both uses as a rewritable type and an additional type can be achieved.

Furthermore, when holes are provided in the recording layer and/or the recording film, for example, by using the configuration described in Embodiment 3 of optimizing the linear velocity of the optical disc to liquefy the recording layer and/or the recording film to be distributed unevenly due to the surface tension, as for the hole part, the material of the recording layer and/or the recording film is distributed unevenly in each hole in the vicinity of the front end side (i.e. side of the starting point of recording) in the rotational direction (i.e. in the travelling direction) and in the vicinity of the back end side (i.e. side of the ending point of recording). In addition, the amount of uneven distribution in the vicinity of the back end side becomes larger than the amount of uneven distribution in the vicinity of the front end side so that the hole part is formed asymmetrically; still, since the optical change due to the hole part is larger, the change due to the asymmetrical part can be absorbed sufficiently. Moreover, since the material of the hole part is distributed unevenly due to the surface tension of the material in the molten state, the impact force accompanied by the vaporization of the material or the like can be suppressed, and the separation of the recording layer and/or the recording film and the like also does not occur.

The configuration of the optical disc applied to the present inventions is exactly the same with the exception of a reflective layer. However, particularly in the case where the optical disc that is configured so as to be provided with through holes has a reflective layer as in Embodiment 3, the holes preferably are formed to penetrate to the reflective layer. In the case of the medium identification information recorded as holes penetrating to the reflective layer, exactly the same medium identification information as the reproduction-only type optical recording medium can be obtained.

In Embodiments 1 to 3 above, the basic methods for recording BCA are described. In Embodiment 4 below, a modulation method at the time of recording and a demodulation method at the time of reproducing will be explained in detail. Furthermore, Embodiment 5 is an example of applying this BCA, in which a method for preventing security from deteriorating due to tampering will be explained, which is assumed to happen in the system of BCA that also is used for initialization.

Embodiment 4

Figure 15:
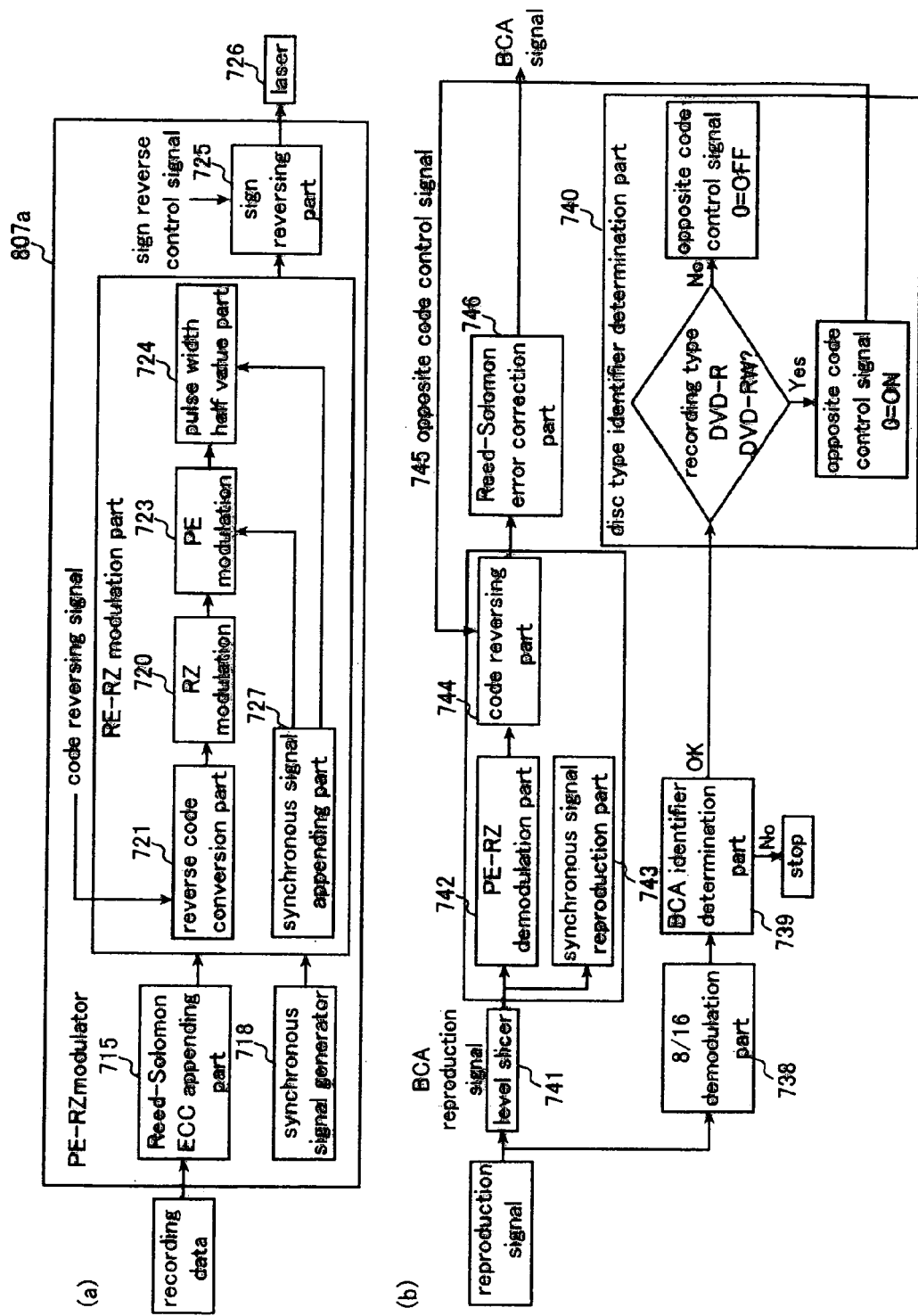
FIG. 15(a) is a block diagram showing an example of a modulation part in a recording device of the present invention.
FIG. 15(b) is a block diagram showing an example of a demodulation part in a reproduction device of the present invention.
Figure 16:
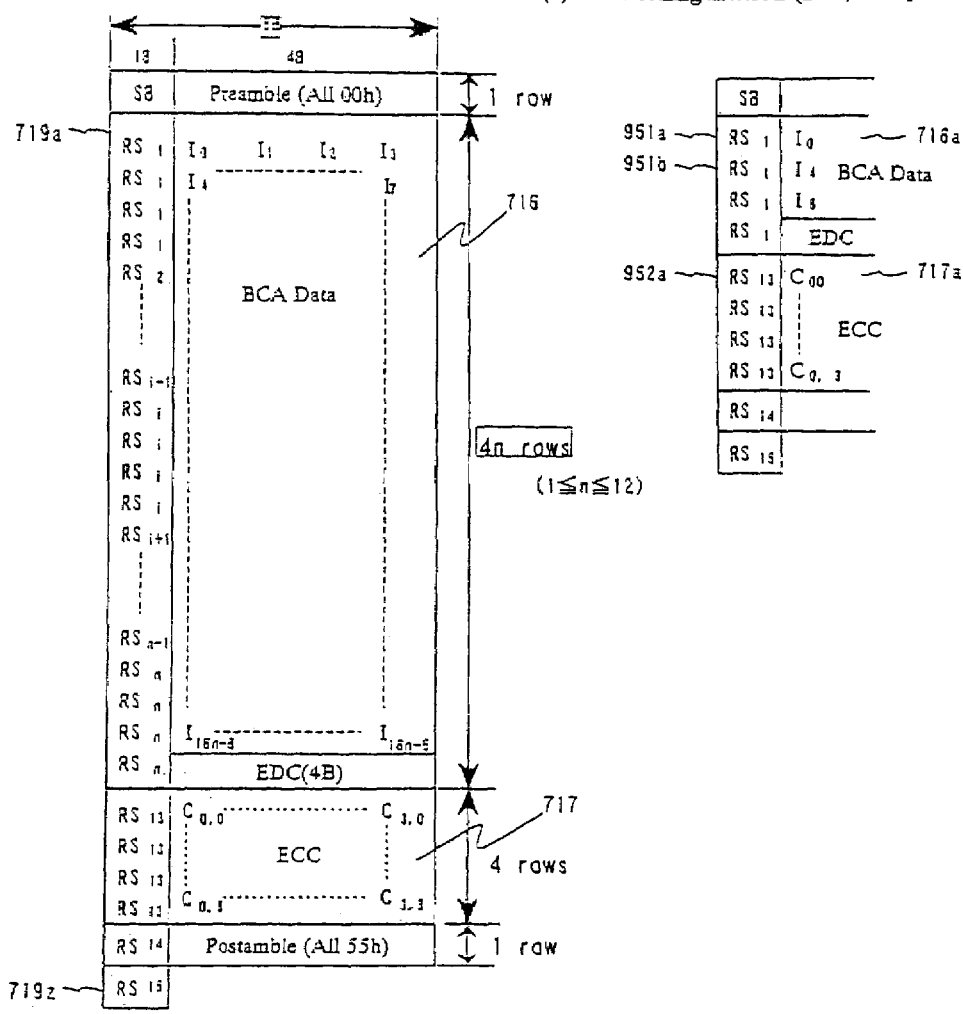
FIG. 16(a) is a structural view of data for BCA, where n=12 and 188 bytes in an example of the present invention.
FIG. 16(b) is a structural view of data for BCA, where n=1 and 12 bytes in an example of the present invention.

With reference to FIG. 15(a), a modulation method for data will be explained in detail. First, as for data to be recorded, a Reed-Solomon system error correction code (ECC) 717 is appended to data 716 in an ECC appending part 715. FIG. 16(a) shows a data configuration in which a Reed-Solomon code is calculated for each of the data 716 of 188 bytes and a 16-bytes ECC 717 is appended. FIG. 16(b) shows a data configuration in the case of recording the data 716a of 12 bytes. The amount of data in the ECC 717a is 16 bytes, so that the data size is the same with that of the ECG part having the data of 188 bytes.

The ECC calculation of the present invention operates such that, when the data has 12 bytes, the data 716a of 12 bytes are not calculated as in the usual manner, but instead, as illustrated in FIG. 17(b), a virtual data configuration 716b of 188 bytes is generated in which 0 is inserted in 166 bytes starting from the last row of $RS_1$ through the non-existent $RS_2$ up to the third row of $RS_n$. In this way, the calculation for error correction is carried out to generate the ECC 717b.

In the case of calculating the error correction of BCA with a small capacity microcomputer of 8 bits or 16 bits used for a DVD drive control, according to the conventional system of performing the ECC calculation in the total of 12 different kinds including 12 bytes, 28 bytes, and those between 44 bytes and 188 bytes, greater program capacity and greater memory space are required for each calculation program, so that the program capacity and the memory space may not be sufficient. The present invention is effective in performing the ECC process with the use of a small capacity microcomputer on which an existing drive is mounted.

Synchronous Code

Next, a synchronous code will be explained. FIG. 18(a) shows synchronous bits 719a to 719z. As illustrated in FIG. 18(b), the fixed pattern of the synchronous signal has an interval of 4T, so that it is easier to distinguish 3T of data and the synchronous pattern.

PE-RZ Modulation

Figure 20:
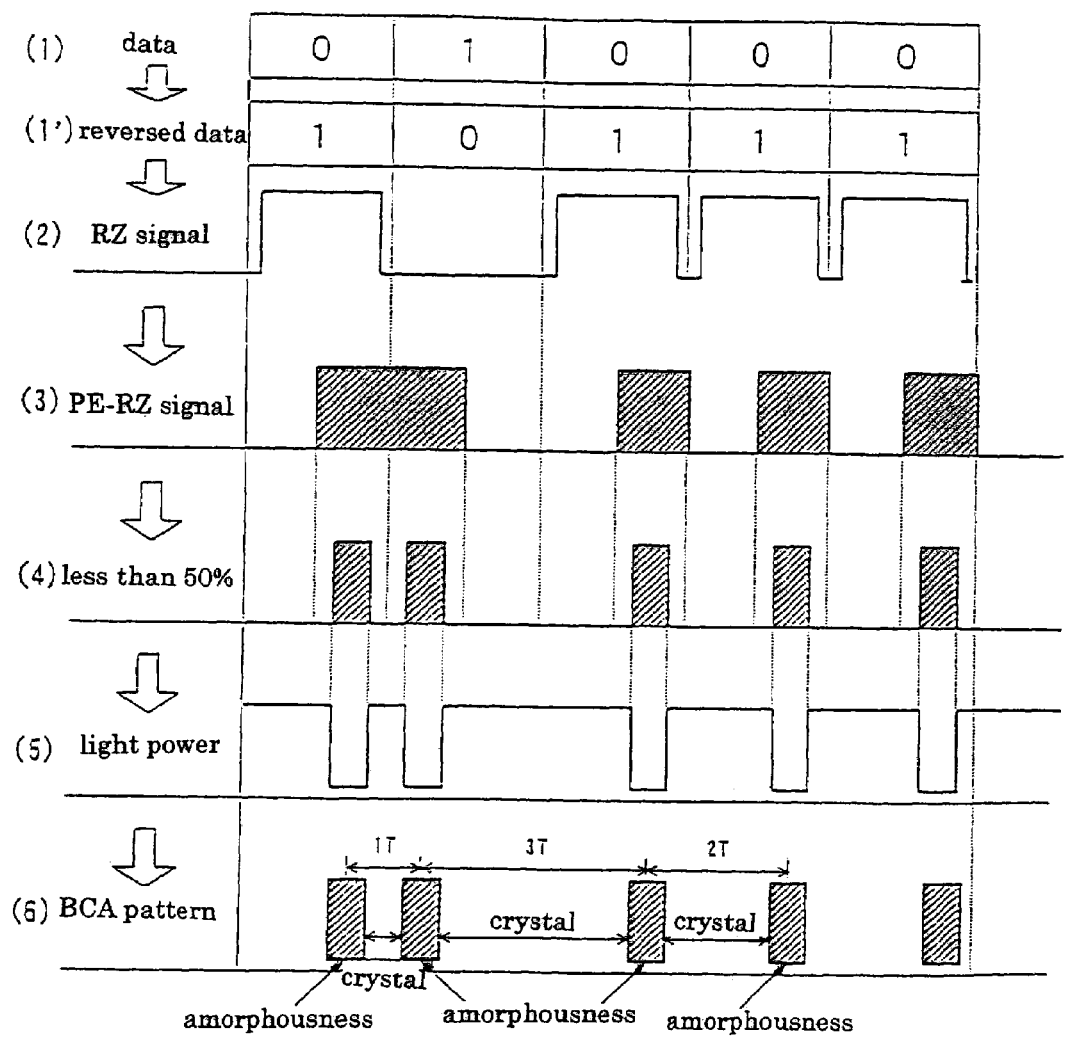
FIG. 20 is a wave form view showing a modulation signal in the case of a RAM type disc in an example of the present invention.

As for the data 716 in which the ECC codes are inserted, when BCA is recorded in the recording type media that perform the same group recording as DVD-ROM such as DVD-R and DVD-RW, 1 and 0 in the data are reversed in a reverse code conversion part 721 of a PE-RZ modulation part 720 so as to be distinguished from ROM discs, which then goes through a PE-RZ modulation in an RZ modulation part 722 and in a PE modulation part 723. To explain by using a waveform view of FIG. 20, (1) shows input data; (1') shows bit reversed data; (2) shows a RZ modulation; and (3) shows a PE-RZ modulation signal. The pulse width of this modulation signal is reduced to 50% or less in a pulse width half value part 724, and a waveform like FIG. 20 (4) is obtained. In the case of a phase change type disc such as DVD-RW, the phase of the waveform is reversed by a sign reversing part 725, and an the initialization beam of a laser 726 is turned OFF only in the BCA modulation part as shown as the light power in (5). As shown in FIG. 20(6), the BCA pattern is recorded and the recording film between BCA is crystallized and initialized. In the present invention, the recording pulse width is reduced to less than half of the original PE-RZ modulation signal, so that the stripe width of each slot is reduced to half as illustrated in FIG. 20(6). Furthermore, since only one stripe is present in 2 slots, the part of BCA, i.e. the low reflective part has a total of ¼ in width, that is, only ¼ in the area ratio of the BCA area 728.

When the recording film is made of a phase change material, a bright section, which is a not yet recorded part, has a low reflectivity of around 20%. If the signal with the recording pulse width of a conventional PE-RZ signal is used as it is, half the width becomes a dark section, which is a recorded part, having the average reflectivity of around 10%, as shown in FIG. 20(3). Since the average reflective light is reduced, the focusing is effected negatively. In the present invention, the pulse width of BCA is reduced to half the width by the pulse width half value part 724, so that the average reflectivity has at least 75% of the reflectivity in the original BCA or in the part where pits are not present. Also with the use of a phase change recording film, the average reflectivity of at least 15% can be obtained in the BCA area. As a result, it is easier to focus, and the focusing is more stable.

Recording in DVD-R

Furthermore, when this recording device is used for recording in DVD-R, by generating a sign reverse control signal and sending it to the sign reversing part 725, the polarity of the light power in FIG. 20(5) is reversed. Thus, the reflectivity of the recording film of DVD-R is reduced in the part where the laser is emitted, so that BCA as in FIG. 20(6) is recorded. Since the function of reversing the polarity of the waveform is present, it is not necessary to reverse the polarity for recording in DVD-R, whereas the polarity is reversed for recording in DVD-RW. In this way, it is effective in recording BCA for both of the media with only one device. Since FIG. 20 has the code reversing part 721, the values 1 and 0 in the modulation data are reversed compared with ROM-type discs. For comparison, the modulation signal of a ROM-type disc is illustrated in FIG. 19.

Figure 19:
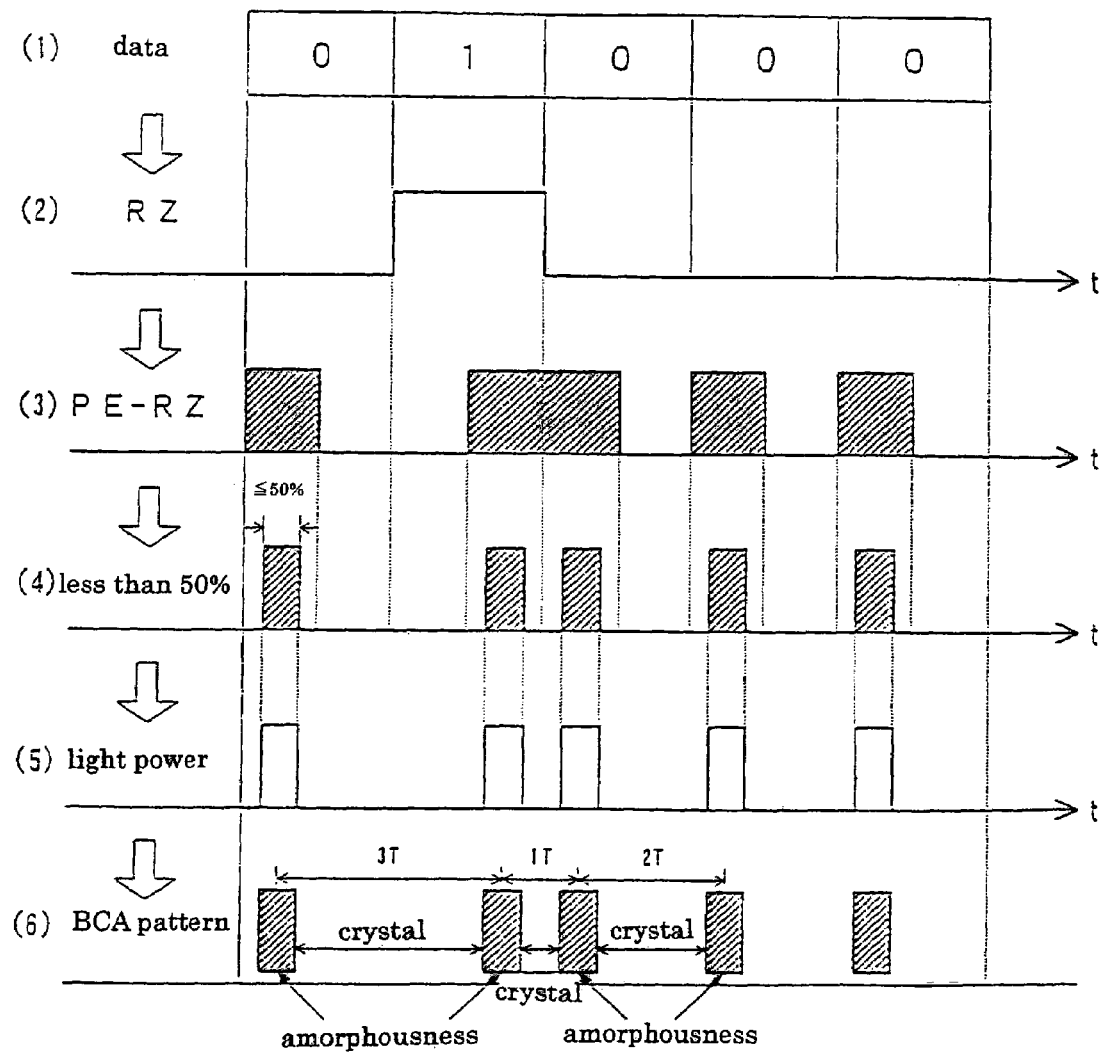
FIG. 19 is a wave form view showing a modulation signal in the case of a ROM type disc in an example of the present invention.

In FIG. 19 and FIG. 20, the input data (1) are the same. However, a code reversing signal is not transmitted in the case of ROM, so that the code reversing part 721 is not operated. Therefore, when the value is "0", the PE-RZ signal is arranged in the slot on the left side as shown in FIG. 19(3), and the BCA pattern also is formed on the left side as shown in FIG. 19(b). On the other hand, a code reversing signal is transmitted in the case of RAM-type media such as DVD-RW, DVD-R and the like, so that when the value is "0", the PE-RZ signal is arranged in the slot on the right side as shown in FIG. 20(3), and the BCA pattern is formed on the right side as shown in (c). As a result, the BCA patterns on the discs are different, so that the BCA of ROM and the BCA of RAM can be distinguished. If an illegal company uses this RAM disc of DVD-RW or DVD-R to copy data of a ROM disc, since the BCA pattern is different, it is identified as not being a ROM disc. In this way, it is effective in preventing an illegal use of discs.

In the present invention, by turning the code reversing part 721 OFF and turning the sign reversing part 725 OFF, BCA can be recorded in a ROM disc as in FIG. 19. It is possible to record regular BCA with one recording device by setting the code reversing part and the sign reversing part ON/ON for DVD-RW, ON/OFF for DVD-R, and OFF/ON for DVD-RAM. By switching the two parts in this way, it is effective in recording BCA for four different media of DVD-ROM, DVD-R, DVD-RW and DVD-RAM with the same recording device.

Arrangement of BCA

Figure 21:
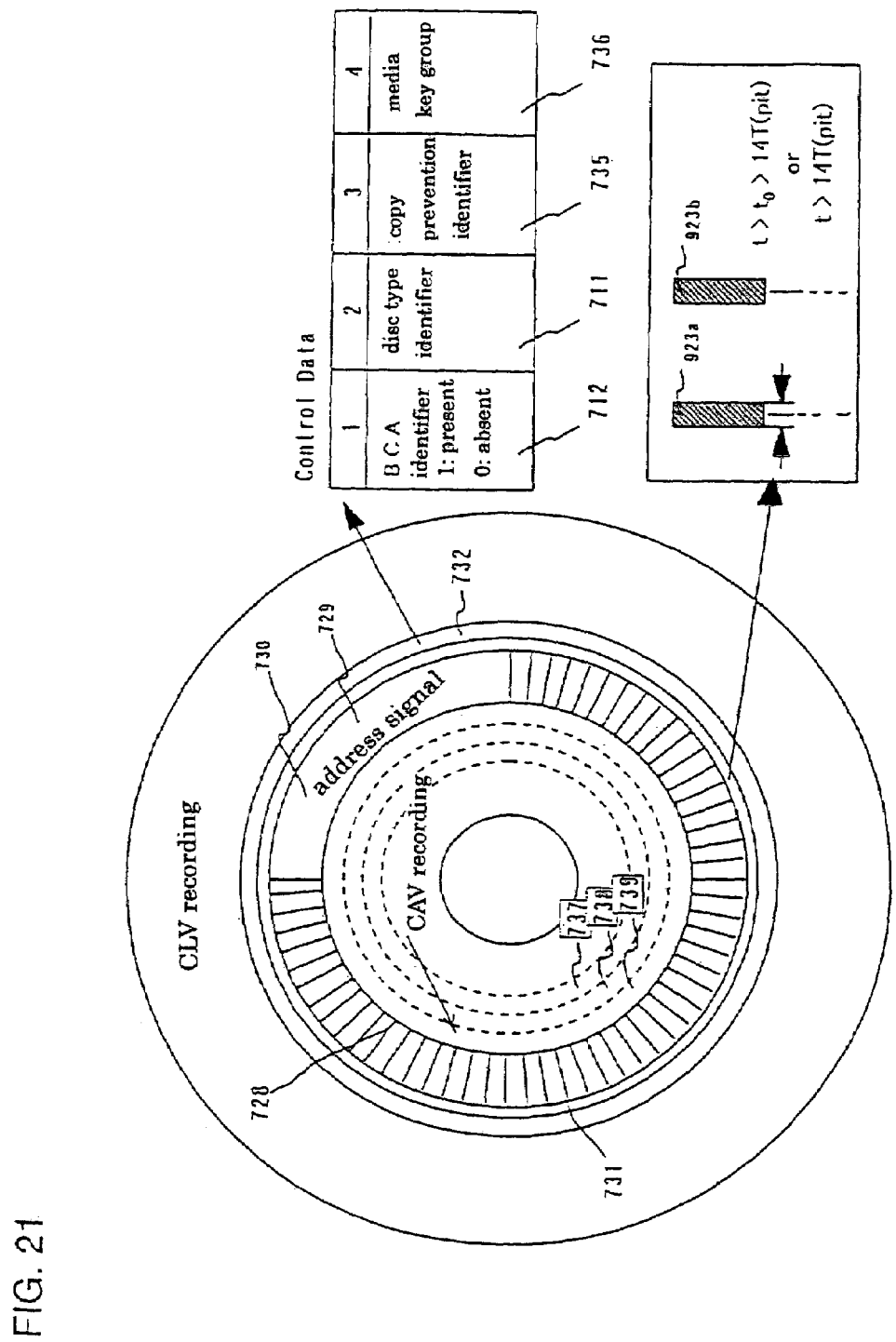
FIG. 21 is a top view showing an example of the position of BCA on a disc of the present invention.

The arrangement of BCA is shown in FIG. 21. As for DVD-ROM and DVD-RAM, the BCA area 728 is located in the inner most periphery of the lead-in area, from the position where the radius is 22.3 mm to the position where the radius is 23.5 mm. In this area, an address 729 is recorded, and since the recording angle of a BCA bar-code has a minimum of 51 degrees and a maximum of 316 degrees, an unrecorded portion exists in a certain angular range of the BCA area. The address can be read in this open area 730, so that the head of the reproduction device can recognize its own position. In the outer peripheral portion of the BCA area, a guard band 731 of more than 50 µm is provided, and in the further outer peripheral portion, control data 732 indicating the physical properties of the disc are recorded by pits. In the control data 732, a BCA existence identifier 712, a disc type identifier 711, a copy prevention identifier 735 for indicating a copy prevention disc, and a media key block 736, i.e. a key group are recorded.

In the case of DVD-R or DVD-RW, a PCA area 737 of a trial writing area for power adjustment is provided in the radial range between 22.1(21.9)mm and 22.3(22.1)mm of the inner peripheral portion of BCA. Also, an RMA area 738 for recording the history of power control is provided in the radial range between 22.3(22.1)mm and 22.6(22.4)mm, and a subsidiary guard band 739 of more than 50 μm is provided in the inner peripheral portion of BCA to avoid the interference between the RMA area and the BCA area 728. Thus, the BCA area 728 always is present in the radial range between 22.8 mm and 23.5 mm, and more specifically, between 22.77 mm and 23.45 mm. By reducing the width of the BCA area in the radial direction compared with ROM, both the PCA and the RMA can coexist, and BCA can be used for DVD-R and DVD-RW. In this case, the successive initialization starts at least from the inner peripheral portion and continues to the radius of 22.65 mm. Then, BCA is recorded by emitting the beam intermittently based on the PE-RZ modulation signal. In the radius of 23.57 mm, the beam is switched completely to successive emission, so that BCA can be recorded by initializing and also without breaking the RMA.

Reproduction Method

With reference to FIG. 15(b), a method for reproducing BCA will be explained. First, the control data 732 are accessed by the optical head and demodulated in a 8–16 demodulation part 738. The BCA identifier 712 is read out from the demodulated control data, and the operation is stopped when a BCA identifier determination part 739 outputs "0", i.e. non-existence. On the other hand, when it outputs "1", i.e. existence, the disc type identifier 711 is read, and only when a disc type identifier determination part 740 indicates that this is a recording type disc such as DVD-R or DVD-RW, a code reversing signal 745 is generated to operate a code reversing part 744.

On the other hand, when the BCA data are reproduced, the optical head is shifted to the BCA area 728 illustrated in FIG. 21 so as to reproduce the BCA signal and to change it to a digital signal by a level slicer 714. Then, a synchronous signal is taken out by a synchronous signal reproduction part 743, and only the BCA data 716 are demodulated by the PE-RZ demodulation part 742. When the code reversing signal 745 mentioned above is turned ON, it is converted as shown in FIG. 20(1') and FIG. 20(1) in the code reversing part 744, and the values 0 and 1 are reversed. In the case of ROM discs, the code reversing signal 745 is not generated, so that the code is not converted. In this way, the original BCA data are reproduced normally. In the Reed-Solomon error correction part 746, in the case where BCA has less than 188 bytes as in FIG. 17(b), 0 data are added to virtually create 188 bytes in order to correct errors by calculating ECC. Thus, the BCA signals are output correctly.

Embodiment 5

Recording Method of a Disc ID

Figure 22:
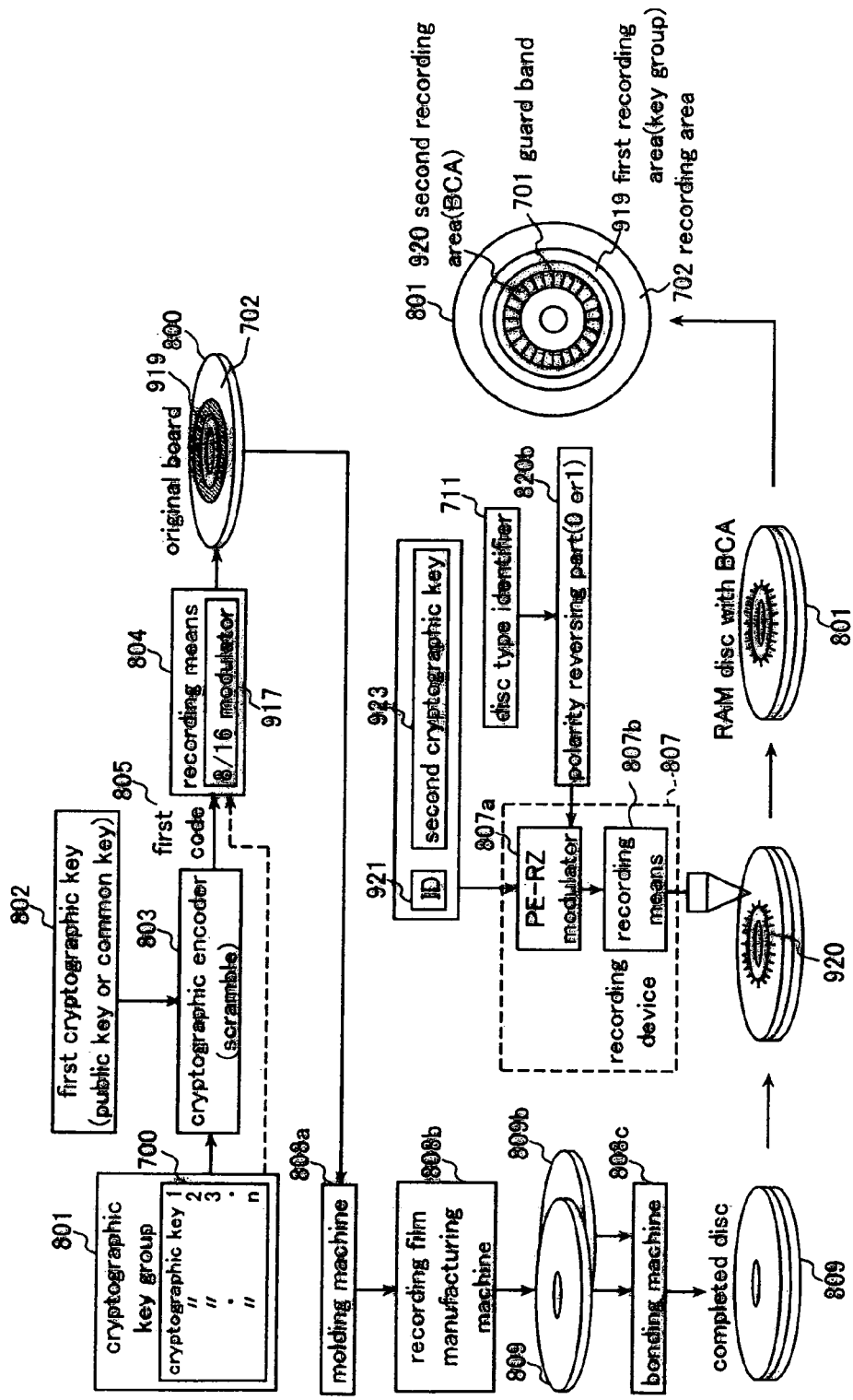
FIG. 22 is a process diagram showing an example of a process for forming a disc and recording BCA of the present invention.

FIG. 22 shows an exemplary manufacturing process for a RAM disc with BCA. First, with the use of a first encryption key 802 such as a public key or a private key, an encryption key group 700 including a plurality of the first to the nth codes is encrypted by a cryptographic encoder 803 to generate a first code 805. This first code 805 is modulated by an 8–16 modulator 917 in the mastering device, and this modulated signal is recorded by a laser as an uneven pit in a first recording area 919 located in the inner peripheral portion of an original board 800. Specifically, as illustrated in FIG. 21, this modulated signal is recorded in the control data area 732 together with the BCA identifier 711, the disc type identifier 712, and the copy prevention identifier 735. This original board 800 is used to mold a disc-shaped transparent substrate 918 with a molding machine 808a. A recording film made of a phase change type recording material or a pigment material is formed on one side of the transparent substrate 918 by a recording film forming machine 808b, thereby two pieces of single-side discs 809a, 809b 0.6 mm thick are created. These discs are glued together by a bonding machine 808c to create a complete disc. In a second recording area 920 of the completed disc 809, by using a BCA recording device 807, a signal of information of a disc ID 921 or a second encryption key 923 for the internet communication is modulated by a PE-RZ modulator 807a in which the PE modulation and the RZ modulation are combined. This modulated signal is recorded by a laser 807b to form a BCA pattern. In this way, a recording type disc with BCA 801 is manufactured. When a phase change type recording material is used, by using the initializer of the present invention as the BCA recording device, the two processes of initializing and BCA recording can be integrated into one process. To describe this process, the recording film after being formed by the recording film forming machine 808b is either in an amorphous state or in an as-depo state, so that the reflectivity is as low as less than 10%. When the initializer is used, the laser beam is focused on a stripe-form beam spot that is long in the radial direction to form an image on the recording surface by a semicylindrical lens, and the disc is rotated. Along with the rotation, the beam is shifted to the outer peripheral portion, and when the beam is emitted continuously, the recording film changes from the amorphous state having low reflectivity to the crystal state having high reflectivity. The disc is initialized continuously from the inner periphery to the outer periphery. In this state, in the second recording area, by turning the laser beam OFF, which is signal 0, when the PE-RZ signal is in the "0 state", and by turning the laser beam ON, which is signal 1, when the PE-RZ signal is in the "1 state", the amorphous state with low reflectivity remains in the area where the laser is turned OFF, whereas the condition changes to the crystal state with high reflectivity in the area where the laser beam is turned ON. As a result, bar-codes are formed on the circumference, and BCA is recorded. When the laser beam moves on to the outer peripheral portion of BCA and reaches the inner peripheral portion of the guard band 731 in FIG. 21, by changing the laser from the emission state at intervals continuously to the ON state according to the BCA signals, the entire recording film that is located further in the outer peripheral portion than the guard band 731 is crystallized, that is, initialized to the outermost periphery.

In the case of DVD-RW, the inner peripheral portion of the BCA is provided with the PCA area 737, the RMA area 738 and the guard band 739 from the area of at least 22.1 mm, 21.9 mm in radius by taking the tolerance in consideration, to the area of 22.6 mm in radius, 22.4 mm in radius by taking the tolerance in consideration. Therefore, the laser is emitted continuously in the first inner peripheral portion and then starts to be emitted intermittently based on the BCA modulation signals in the position between 22.65 mm and 22.77 mm in radius (between about 22.6 and 22.8 mm) so as to record the BCA pattern in the BCA area 728. Then, the laser is switched from the intermittent emission to the successive emission in the position between 23.45 mm and 23.55 mm in radius. Accordingly, BCA is not recorded in the guard band 731 of FIG. 21, while the control data 732 in the outer peripheral portion of BCA as well as the PCA area 737 and the RMA area 738 in the inner peripheral portion of BCA are initialized completely on the entire circumference. Therefore, this configuration is effective in reading data or addresses stably by the optical head in the PCA and RMA areas.

The disc used here is a bonded disc, and the BCA inserted in the disc cannot be tampered with, which can be used for security purposes. Furthermore, a DVD-RAM drive and a DVD-RW drive that are commonly available on the market have circular beam spots. Even if an illegal user tries to tamper with the BCA part with the circular beam of this commercial drive or tries to erase BCA, the amorphous state remains between the tracks, so that BCA cannot be erased completely. As a result, commercial drives cannot be used for tampering with the BCA data, and therefore, high security effects can be obtained as a consumer product. On the other hand, a disc that is exactly like a DVD-ROM may be copied by using a group recording type RAM disc such as a DVD-RW or a DVD-R. To prevent this from happening, as explained in FIG. 20, the modulation rule is reversed compared with a ROM disc only in the data part of the PE-RZ modulation by the code polarity reversing part 820*b*. Specifically, in the case of ROM, when the BCA data are "0" and "1", the modulated signals are respectively "01," for "10", while the modulated signals are respectively reversed to "01", "10" in the case of RAM. Thus, the PE-RZ modulated signals in the ROM and the RAM are different, so that the attempt to create a copy of a ROM disc with a RAM disc can be distinguished and detected that it is illegal. As a result, the copy prevention can be achieved.

Application to Copyright Protection

Figure 23:
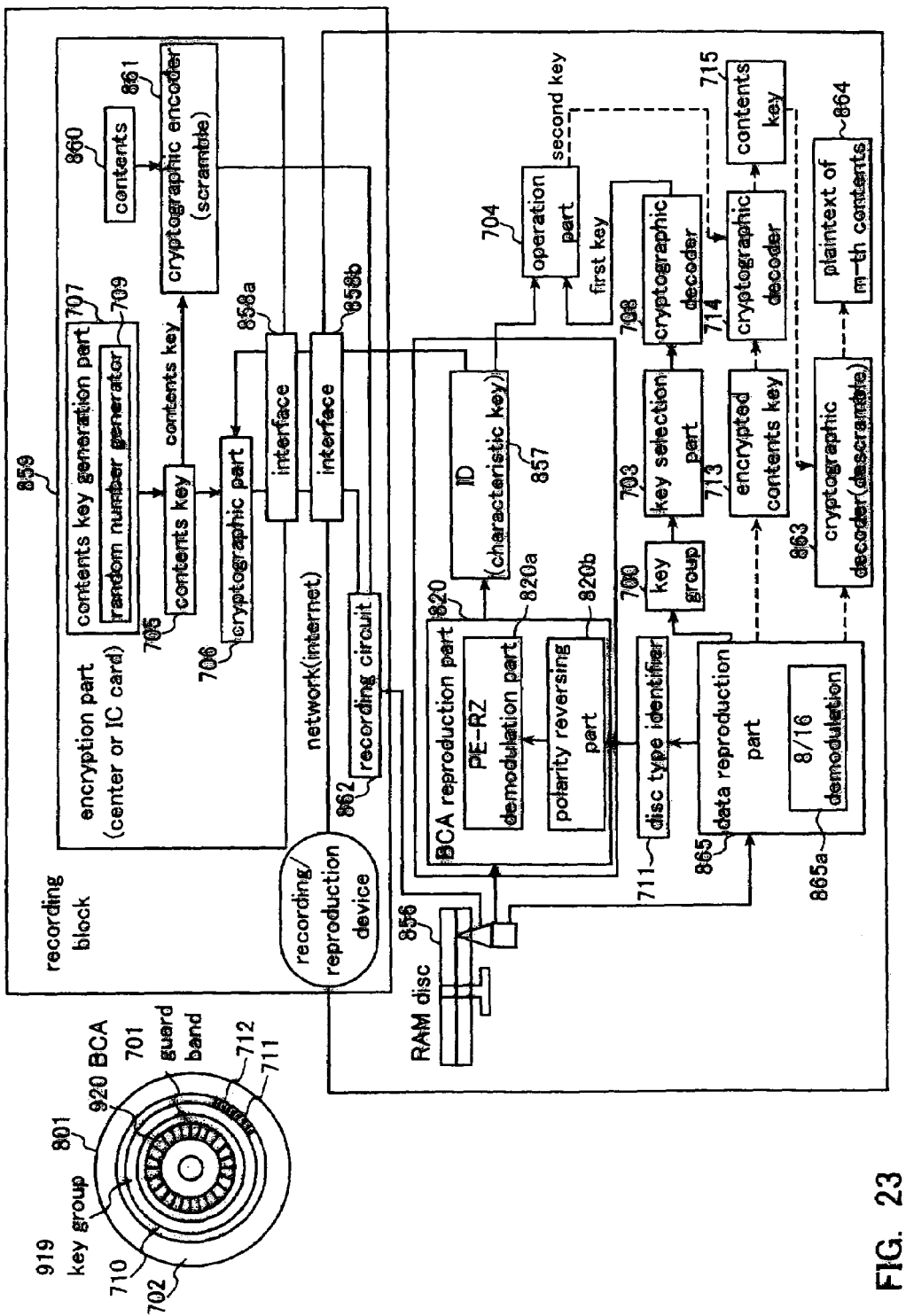
FIG. 23 is a block diagram of a recording/reproduction device used for encryption and decryption of contents using an example of BCA of the present invention.

With reference to FIG. 23, an example of applying this hard-to-tamper-with BCA to copyright protection will be explained. First, the encryption procedure with the use of BCA at the time when contents are permitted to be copied only once to a RAM disc will be explained. When an only once copy permission identifier is detected, a BCA area 920 of a RAM disc 856 is accessed, and the BCA data are reproduced by the PE-RZ demodulation in a BCA reproduction part 820, and then an ID 857 peculiar to the disc is output. Furthermore, while the first to the n-th key, i.e. a plurality of key groups 700 are recorded in a second recording area 919 of the RAM disc 856, a key authorized for each manufacturer's drive is selected by a key selection part 703, which is decoded by a cryptographic decoder 708 so as to generate the "first key". When this "first key" and the ID 857 peculiar to the disc are calculated in an operation part 704 by the one-way function, the "second key" is generated. This key is peculiar to each RAM disc and also different for each disc. This "second key" is sent to a cryptographic part 706 in an encryption part 859.

In the encryption part 859, a contents key 705 is generated by a random number generator 709 in a contents key generation part 707. This contents key is encrypted by using the "second key" described above in the cryptographic part 706. This "encrypted contents key" is recorded by a recording circuit 862 in a recording area 702 of the disc 856.

On the other hand, contents 860 comprising picture signals such as movie or sound signals such as music are encrypted with the use of the contents key 705 in the cryptographic encoder 861 and recorded by the recording circuit 862 in the recording area 702 of the RAM disc 856.

Figure 24:
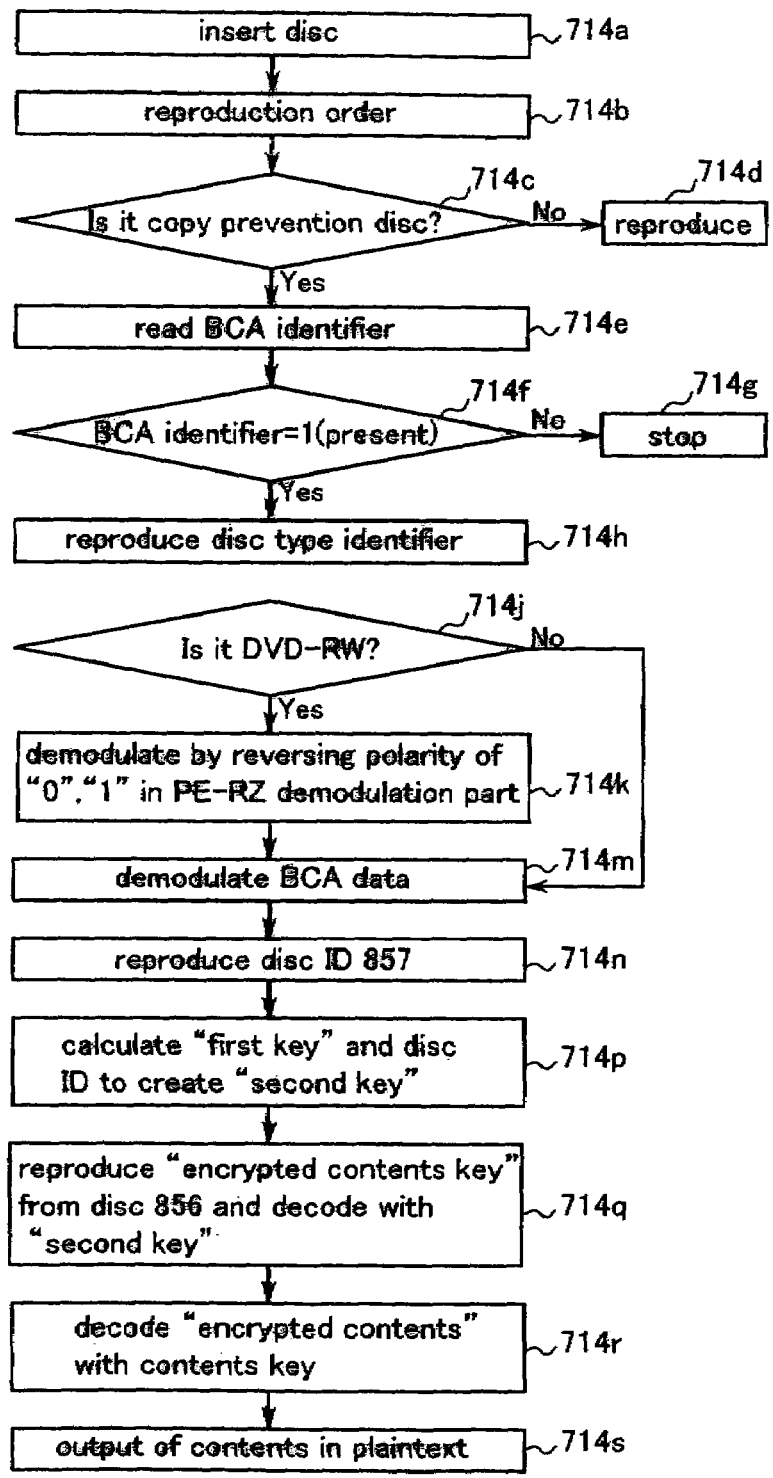
FIG. 24 is a flow chart showing a process for decrypting and reproducing the contents in an example of the recording/reproduction device of the present invention.

Next, the process of reproducing this contents signal will be explained with reference to a block diagram of FIG. 23 and a flow chart of FIG. 24. First, a disc is inserted (step 714*a*); a reproduction order of the contents is received (step 714*b*); a copy prevention identifier 735 in the control data 732 of the disc is referred to for judging whether this disc is a copy prevention disc such as CPRM (step 714*c*); and, if the disc is not a copy prevention disc, the contents are reproduced as recorded (step 714*d*). If the disc is a copy prevention disc, the BCA identifier 712 in the control data is read in the step 714*e*. Alternatively, when the BCA identifier 712 in the control data (step 714*e*) does not indicate the presence of BCA (step 714*f*), the BCA is not reproduced (step 714*g*). At this time, from the BCA area of the RAM disc 856, the information in BCA including the ID 857 is reproduced by the PE-RZ demodulation part of the BCA reproduction part 820 (step 714*n*). After reading the control data 710 in which the physical properties of the disc 702 are recorded (step 714*h*), the disc type identifier 711 (step 714*h*) judges whether the disc is DVD-ROM, DVD-RAM, DVD-RW, or DVD-R. If the disc is DVD-RW or DVD-R (step 714*j*), the polarity of the code in the data is reversed by the polarity reversing part 820*b* of the PE-RZ demodulation part 820*a* (step 714*k*). In other words, if the reproduced modulated signal is "01", the output data is demodulated to "1", and if the reproduced modulated signal is "10", the output data is demodulated to "0". Thus, it is demodulated to be the opposite of DVD-ROM (step 714*m*). The main data is demodulated by the 8–16 demodulator 865*a* of the data reproduction part 865. First, the key group 700 including a plurality of keys is reproduced from the key block area 919; a key suitable for this device is selected by the key selection part 703; the key is decoded in the cryptographic decoder 708 to reproduce the "first key". This ID 857 and the above-mentioned "first key" are calculated in the operation part 704 to generate the "second key" (step 714*p*). Up to this point, the procedure is the same with the recording mode of the contents. The reproduction mode of the encrypted contents differs in that the "encrypted contents key" is reproduced and decrypted from the disc 856, and the encrypted contents are decrypted. The flow of the reproduction-only will be explained in detail with dotted lines in FIG. 23.

The "encrypted contents key 713" that is recorded in the recording area 702 of the disc 856 is reproduced in the data reproduction part 865, which is then decrypted in the cryptographic decoder 714 by using the "second key" described above, thereby decoding the contents key 715 (step 714*q*). This contents key is used as the decryption key to decrypt the "encrypted contents" in the cryptographic decoder 863 (step 714*r*), and a plaintext 864 of the m-th contents is output (714*s*). In the case where the data are copied regularly in only one disc, one of the contents keys recorded and encrypted in the RAM disc forms a counterpart to the disc ID, and the code is decrypted or descrambled correctly, so that the plaintext 864 of the m-th contents is output. With regard to picture information, MPEG signals are expanded to obtain picture signals.

In this case, the disc ID is the key of encryption. Since the ID number is administered and generated such that only one disc ID exists in the world, the effect that copying the data is possible to only one RAM disc can be obtained. The principle will be explained below.

Here, it is prohibited to copy the data from the RAM disc that is initially copied regularly to another RAM disc. However, if the encrypted contents are bit copied illegally in the original state, the disc ID for the first disc (ID1) and the disc ID for the other RAM disc, i.e. the illegally copied disc (ID2), have different numbers. When the BCA of the illegally copied RAM disc is reproduced, the ID2 is reproduced. However, the contents and/or the title key are encrypted with the ID1, so that the attempt to release the data with the ID2 in the cryptographic decoder 863 fails. Namely, the title key or the code of the contents is not decrypted correctly because the keys are different. In this way, the signals of the illegally copied RAM disc cannot be output, and the copyright is protected. Since the present invention operates according to the Disc ID system, as for a regular RAM disc that is copied regularly for only once, the code can be released by using any drive, which is highly convenient. In this case, the encryption part 859 may be a key administration center in a remote place or an IC card mounted with a cryptographic encoder. Alternatively, the encryption part 859 may be included in the recording/reproduction device.

In the case where BCA is recorded by an initializer, the BCA cannot be erased with the drives available on the market, but it is possible for a user to obtain a recording disc without BCA and to record BCA therein. To deal with this problem, the present invention has the following advantage: the BCA identifier 712 is recorded by a pre-pit in the control data 710 of the original board, so that the BCA identifier 712 of the disc in which BCA is not recorded indicates "0", i.e. none, and the disc cannot be tampered with due to the pre-pit. As a result, even if BCA is recorded illegally in this RAM disc without BCA record afterwards, the BCA identifier cannot be tampered with, so that the reproduction device judges the disc illegal and does not operate.

The above embodiments use a rewritable phase change type optical disc and are described by referring to the case in which the recording layer of the subsidiary information area and the recording layer of the main information area are the same. However, the present invention also includes the cases in which only the part where the medium identification information is recorded is changed in the recording layer to have a different material composition (for example, to reduce the recording sensibility), only the part where the medium identification information is recorded is changed in the recording layer to have a different material (for example, to apply a pigment type material), the recording layer is removed only in the part where the medium identification information is recorded and only the reflective layer is present, and the like.

Furthermore, the present invention can be applied also to a configuration using materials such as a magnet-optical material or a pigment material for the recording layer besides the phase change material.

INDUSTRIAL APPLICABILITY

As described above, the present invention has the advantage of stably recording medium identification information to an optical recording medium. In particular, the initialization of the phase change type optical recording medium and the recording of the medium identification information can be performed at the same time. Thus, the production process can be simplified, and the production costs can be reduced.

What is claimed is:

1. An optical recording medium provided with a main information area having a laminated thin film layer including an information layer capable of recording an information signal and a subsidiary information area for recording subsidiary information that is different from the information signal, which are divided in one principal plane direction of a substrate, wherein the information layer for recording the information signal in the main information area is provided also in a lead-in area including the subsidiary information area, medium identification information for distinguishing the medium optically by an optical head used for recording the information signal in the information layer of the main information area is recorded in the information layer of the subsidiary information area in the lead-in area with a modulation method that is different from a light beam modulation method used for recording the information signal in the information layer of the main information area, and a plurality of encryption keys used for encrypting an encryption key of the information signal to be recorded in the main information area is provided in an outer periphery of the subsidiary information area in the lead-in area.

2. The optical recording medium according to claim 1, wherein the encryption key of the information signal is encrypted by calculation of the plurality of encryption keys and the medium identification information in the lead-in area.

\* \* \* \* \*

UNITED STATES PATENT AND TRADEMARK OFFICE
CERTIFICATE OF CORRECTION

PATENT NO.        : 7,200,102 B2
APPLICATION NO.   : 11/085398
DATED             : April 3, 2007
INVENTOR(S)       : Irie et al.

It is certified that error appears in the above-identified patent and that said Letters Patent is hereby corrected as shown below:

Title page, item [75] inventor, --Yoshihisa Fukushima, Osaka (JP)-- should be added Signed and Sealed this Sixteenth Day of October, 2007

JON W. DUDAS
*Director of the United States Patent and Trademark Office*